United States Patent
Laverdiere et al.

(10) Patent No.: US 7,572,367 B2
(45) Date of Patent: Aug. 11, 2009

(54) LIQUID FILTRATION DEVICE

(75) Inventors: Marc Laverdiere, Wakefield, MA (US);
Michael Clarke, Santa Cruz, CA (US)

(73) Assignee: Entegris, Inc., Chaska, MN (US)

( * ) Notice: Subject to any disclaimer, the term of this patent is extended or adjusted under 35 U.S.C. 154(b) by 0 days.

(21) Appl. No.: 12/221,309

(22) Filed: Aug. 1, 2008

(65) Prior Publication Data

US 2008/0302712 A1     Dec. 11, 2008

Related U.S. Application Data

(60) Continuation of application No. 11/591,283, filed on Nov. 1, 2006, now Pat. No. 7,407,594, which is a continuation of application No. 11/281,102, filed on Nov. 16, 2005, now abandoned, which is a continuation of application No. 11/019,966, filed on Dec. 21, 2004, now Pat. No. 6,982,041, which is a division of application No. 10/380,314, filed as application No. PCT/US01/28771 on Sep. 13, 2001, now Pat. No. 6,846,409.

(60) Provisional application No. 60/232,209, filed on Sep. 13, 2000.

(51) Int. Cl.
*B01D 35/01*   (2006.01)
*B01D 36/00*   (2006.01)
*B01D 29/15*   (2006.01)
*B01D 19/00*   (2006.01)

(52) U.S. Cl. ...................... 210/188; 210/436

(58) Field of Classification Search ............... 210/741, 210/761, 767, 120, 188, 436, 472; 137/197, 137/198; 96/219
See application file for complete search history.

(56) References Cited

U.S. PATENT DOCUMENTS

| | | | |
|---|---|---|---|
| 136,631 A | 3/1873 | Westinghouse |
| 420,209 A | 1/1890 | Nilson |
| 468,390 A | 2/1892 | Westerman |
| 872,174 A | 11/1907 | Fyock et al. |
| 872,707 A | 12/1907 | Beahm |
| 891,718 A | 6/1908 | McMillan |
| 898,214 A | 9/1908 | Gold |
| 940,334 A | 11/1909 | Leftwich |
| 967,516 A | 8/1910 | Harrison |
| 1,070,110 A | 8/1913 | Brown |
| 1,186,068 A | 6/1916 | Benjamin |
| 1,221,682 A | 4/1917 | Coffield |
| 1,389,012 A | 8/1921 | Roberts |

(Continued)

FOREIGN PATENT DOCUMENTS

DE   3100564 A1   8/1982

(Continued)

OTHER PUBLICATIONS

Jan. 12, 2009, Office Action, EP 01 968 877.9 -2113.

(Continued)

*Primary Examiner*—Fred Prince
(74) *Attorney, Agent, or Firm*—Hamilton, Brook, Smith & Reynolds, P.C.

(57) ABSTRACT

The present invention provides a liquid filtration device with internal flow paths that facilitate the purging of air bubbles from the device. The device includes internal channels that collect bubbles from fluid entering the filtration device and more efficiently direct fluid to sweep bubbles from the device during operation. The present invention also provides for an automatic means to minimize fluid loss during a vent process.

33 Claims, 16 Drawing Sheets

U.S. PATENT DOCUMENTS

| | | |
|---|---|---|
| 1,786,066 A | 12/1930 | Herman |
| 1,886,398 A | 11/1932 | Harrell |
| 2,462,488 A | 2/1949 | Gunn |
| 2,997,180 A | 8/1961 | Loveday |
| 3,052,863 A | 9/1962 | Uberbacher et al. |
| 3,107,601 A | 10/1963 | Longmire |
| 3,214,195 A | 10/1965 | Zahurance et al. |
| 3,399,776 A | 9/1968 | Knuth |
| 3,469,863 A | 9/1969 | Riester et al. |
| 3,485,516 A | 12/1969 | Keller et al. |
| 3,493,115 A | 2/1970 | Koches |
| 3,519,133 A | 7/1970 | Broering |
| 3,560,377 A | 2/1971 | Loeffler |
| 3,628,662 A | 12/1971 | Kudlaty |
| 3,695,446 A | 10/1972 | Lyall et al. |
| 3,706,184 A | 12/1972 | Tucker |
| 3,727,764 A | 4/1973 | Ogden |
| 3,734,851 A | 5/1973 | Matsumara |
| 3,802,564 A | 4/1974 | Turman |
| 3,812,659 A | 5/1974 | Westergren et al. |
| 3,880,757 A | 4/1975 | Thomason |
| 3,935,106 A | 1/1976 | Lipner |
| 3,947,080 A | 3/1976 | Ege |
| 3,950,251 A | 4/1976 | Hiller |
| 4,013,384 A | 3/1977 | Oikawa |
| 4,047,847 A | 9/1977 | Oikawa |
| 4,089,549 A | 5/1978 | Vyse et al. |
| 4,151,823 A | 5/1979 | Grosse et al. |
| 4,174,231 A | 11/1979 | Hobgood |
| 4,187,179 A | 2/1980 | Harms |
| 4,269,219 A | 5/1981 | Dybvig |
| 4,283,284 A | 8/1981 | Schnell |
| 4,298,358 A | 11/1981 | Ruschke |
| 4,321,911 A | 3/1982 | Offutt |
| 4,344,777 A | 8/1982 | Siposs |
| 4,404,103 A | 9/1983 | Drath |
| 4,411,783 A | 10/1983 | Dickens et al. |
| 4,414,109 A | 11/1983 | Aurthur |
| 4,416,775 A | 11/1983 | Halbich et al. |
| 4,494,775 A | 1/1985 | Nash et al. |
| 4,498,989 A | 2/1985 | Miyakawa et al. |
| 4,500,426 A | 2/1985 | Ishii et al. |
| 4,522,717 A | 6/1985 | Brust |
| 4,524,807 A | 6/1985 | Toliusis |
| 4,529,512 A | 7/1985 | Williamson et al. |
| 4,535,997 A | 8/1985 | Brust |
| 4,555,130 A | 11/1985 | McClain |
| 4,559,136 A | 12/1985 | Dockery |
| 4,568,456 A | 2/1986 | van Zon |
| 4,591,438 A | 5/1986 | Tanabe et al. |
| 4,610,781 A | 9/1986 | Bilstad et al. |
| 4,629,563 A | 12/1986 | Wrasidlo |
| 4,629,568 A | 12/1986 | Ellis, III |
| 4,636,307 A | 1/1987 | Inoue et al. |
| 4,645,601 A | 2/1987 | Regunathan et al. |
| 4,654,142 A | 3/1987 | Thomsen et al. |
| 4,664,420 A | 5/1987 | Demeri |
| 4,698,154 A | 10/1987 | Mohn et al. |
| 4,719,012 A | 1/1988 | Groezinger et al. |
| 4,735,716 A | 4/1988 | Petrucci et al. |
| RE32,711 E * | 7/1988 | Dickens et al. .............. 210/304 |
| 4,759,571 A | 7/1988 | Stone et al. |
| 4,806,240 A | 2/1989 | Giordano et al. |
| 4,820,174 A | 4/1989 | Farrar et al. |
| 4,824,564 A | 4/1989 | Edwards et al. |
| 4,846,800 A | 7/1989 | Ouriel et al. |
| 4,857,189 A | 8/1989 | Thomsen et al. |
| 4,857,191 A | 8/1989 | Wolf |
| 4,861,476 A | 8/1989 | Kohlheb et al. |
| 4,870,961 A | 10/1989 | Barnard |
| 4,879,032 A | 11/1989 | Zemlin |
| 4,900,065 A | 2/1990 | Houck |
| 4,900,449 A | 2/1990 | Kraus et al. |
| 4,904,382 A | 2/1990 | Thomsen |
| 4,932,987 A | 6/1990 | Molina |
| 4,944,776 A | 7/1990 | Keyser et al. |
| 4,964,984 A | 10/1990 | Reeder |
| 4,966,699 A | 10/1990 | Sasaki et al. |
| 5,022,986 A | 6/1991 | Lang |
| 5,041,220 A | 8/1991 | Lee et al. |
| 5,057,131 A | 10/1991 | Lackner et al. |
| 5,066,391 A | 11/1991 | Faria |
| 5,069,780 A | 12/1991 | Thalmann et al. |
| 5,076,925 A | 12/1991 | Roesink et al. |
| 5,085,772 A | 2/1992 | Busch-Sorensen |
| 5,096,230 A | 3/1992 | Bausch et al. |
| 5,108,598 A | 4/1992 | Posner |
| 5,125,691 A | 6/1992 | Bogdan |
| 5,133,858 A | 7/1992 | Walz et al. |
| 5,139,668 A | 8/1992 | Pan et al. |
| 5,139,669 A | 8/1992 | Clermont et al. |
| RE34,050 E | 9/1992 | Thomsen et al. |
| 5,143,575 A | 9/1992 | Glässel et al. |
| 5,160,042 A | 11/1992 | Bikson et al. |
| 5,160,615 A | 11/1992 | Takagi et al. |
| 5,167,814 A | 12/1992 | Pulek |
| 5,167,837 A | 12/1992 | Snodgrass et al. |
| 5,172,998 A | 12/1992 | Hatagishi |
| 5,178,758 A | 1/1993 | Hwang |
| 5,180,490 A | 1/1993 | Eihusen et al. |
| 5,192,499 A | 3/1993 | Sakai et al. |
| 5,221,473 A | 6/1993 | Burrows |
| 5,230,760 A | 7/1993 | Tanabe |
| 5,230,812 A | 7/1993 | Williams |
| 5,262,068 A | 11/1993 | Bowers et al. |
| 5,262,069 A | 11/1993 | Kato |
| 5,316,347 A | 5/1994 | Arosio |
| 5,320,752 A | 6/1994 | Clack et al. |
| 5,324,483 A | 6/1994 | Cody et al. |
| 5,341,832 A | 8/1994 | Foust |
| 5,342,518 A | 8/1994 | Posner et al. |
| 5,344,194 A | 9/1994 | Hatagishi et al. |
| 5,354,464 A | 10/1994 | Slovak et al. |
| 5,373,595 A | 12/1994 | Johnson et al. |
| 5,380,437 A | 1/1995 | Bertoncini |
| 5,383,690 A | 1/1995 | Niemeier et al. |
| 5,387,339 A | 2/1995 | Lee et al. |
| 5,389,260 A | 2/1995 | Hemp et al. |
| 5,397,462 A | 3/1995 | Higashijima et al. |
| 5,397,468 A | 3/1995 | Chomka et al. |
| 5,399,263 A | 3/1995 | Chomka et al. |
| 5,401,401 A | 3/1995 | Hickok et al. |
| 5,413,711 A | 5/1995 | Janik |
| 5,417,459 A | 5/1995 | Gray et al. |
| 5,435,915 A | 7/1995 | Connors, Jr. |
| 5,437,483 A | 8/1995 | Umezawa |
| 5,449,454 A | 9/1995 | Hickok |
| 5,453,184 A | 9/1995 | Handtmann |
| 5,462,675 A | 10/1995 | Hopkins et al. |
| 5,468,388 A | 11/1995 | Goddard et al. |
| 5,468,390 A | 11/1995 | Crivello et al. |
| 5,474,683 A | 12/1995 | Bryant et al. |
| 5,478,119 A | 12/1995 | Dye |
| 5,486,288 A | 1/1996 | Stanford et al. |
| 5,505,842 A | 4/1996 | Enderle |
| 5,507,530 A | 4/1996 | Mahaney |
| 5,516,429 A | 5/1996 | Snodgrass et al. |
| 5,525,225 A | 6/1996 | Janik et al. |
| 5,558,371 A | 9/1996 | Lordo |
| 5,601,710 A | 2/1997 | Yoon et al. |
| 5,605,624 A | 2/1997 | Wright |
| 5,620,599 A | 4/1997 | Hopkins et al. |
| 5,632,894 A | 5/1997 | White et al. |
| 5,651,887 A | 7/1997 | Posner et al. |

| | | | |
|---|---|---|---|
| 5,653,871 A | 8/1997 | Thomsen | |
| 5,667,566 A | 9/1997 | Flynn et al. | |
| 5,667,679 A | 9/1997 | Bozenmayer et al. | |
| 5,702,597 A | 12/1997 | Chevallet et al. | |
| 5,725,623 A | 3/1998 | Bowerman et al. | |
| 5,744,047 A | 4/1998 | Gsell et al. | |
| 5,762,787 A | 6/1998 | Park et al. | |
| 5,762,789 A | 6/1998 | de los Reyes et al. | |
| 5,779,903 A | 7/1998 | Smith et al. | |
| 5,782,791 A | 7/1998 | Peterson et al. | |
| 5,816,621 A | 10/1998 | Frost | |
| 5,824,217 A | 10/1998 | Pearl et al. | |
| 5,842,724 A | 12/1998 | Kozinski et al. | |
| 5,842,888 A | 12/1998 | Belopolsky | |
| 5,858,224 A | 1/1999 | Schwandt et al. | |
| 5,902,551 A | 5/1999 | Cowan et al. | |
| 5,911,879 A | 6/1999 | Eybergen | |
| 5,922,196 A | 7/1999 | Baumann | |
| 5,925,025 A | 7/1999 | Weilbacher et al. | |
| 5,927,759 A | 7/1999 | Hyslop | |
| 5,944,990 A | 8/1999 | Edens | |
| 5,951,862 A | 9/1999 | Bradford | |
| 5,984,371 A | 11/1999 | Mailleux | |
| 6,024,229 A | 2/2000 | Ayers | |
| D423,081 S | 4/2000 | Niermeyer | |
| 6,048,454 A | 4/2000 | Jenkins | |
| 6,059,318 A | 5/2000 | Estep et al. | |
| 6,059,797 A | 5/2000 | Mears | |
| 6,068,770 A | 5/2000 | Niermeyer et al. | |
| 6,139,738 A | 10/2000 | Maxwell | |
| 6,142,063 A | 11/2000 | Beaulieu et al. | |
| 6,142,170 A | 11/2000 | Belfer et al. | |
| 6,159,366 A | 12/2000 | Carroll | |
| 6,176,904 B1 * | 1/2001 | Gupta | 96/209 |
| 6,251,270 B1 | 6/2001 | Blot-Carretero et al. | |
| 6,290,523 B1 | 9/2001 | Barnhart et al. | |
| 6,348,149 B1 | 2/2002 | Jenkins | |
| 6,378,907 B1 | 4/2002 | Cambell et al. | |
| 6,387,271 B1 | 5/2002 | Geibel et al. | |
| 6,523,861 B1 | 2/2003 | Clancy et al. | |
| 6,533,933 B1 | 3/2003 | Stankowski et al. | |
| 6,547,284 B2 | 4/2003 | Rose et al. | |
| 6,581,974 B1 | 6/2003 | Ragner et al. | |
| 6,634,509 B2 | 10/2003 | Ochi | |
| 6,733,250 B2 | 5/2004 | Yajima | |
| 6,752,159 B1 | 6/2004 | Kavadeles et al. | |
| 6,840,548 B2 | 1/2005 | Lacroix | |
| 6,846,409 B2 | 1/2005 | Laverdiere et al. | |
| 6,902,671 B2 | 6/2005 | Cappia et al. | |
| 6,982,041 B2 | 1/2006 | Laverdiere et al. | |
| 7,021,667 B2 | 4/2006 | Campbell et al. | |
| 7,029,238 B1 | 4/2006 | Zagars et al. | |
| 7,037,424 B2 | 5/2006 | Niermeyer et al. | |
| 7,163,037 B2 | 1/2007 | Walkowski | |
| 7,163,237 B2 | 1/2007 | Niermeyer et al. | |
| 7,195,122 B2 | 3/2007 | Hiranaga et al. | |
| 7,296,582 B2 | 11/2007 | Campbell et al. | |
| 7,350,821 B2 | 4/2008 | Campbell et al. | |
| 7,407,594 B2 | 8/2008 | Laverdiere et al. | |
| 2002/0060189 A1 | 5/2002 | Conrad | |
| 2002/0163187 A1 | 11/2002 | Pelfrey et al. | |
| 2003/0213736 A1 | 11/2003 | Hiranaga et al. | |
| 2004/0070200 A1 | 4/2004 | Wargo et al. | |
| 2004/0070201 A1 | 4/2004 | de los Reyes et al. | |
| 2005/0126985 A1 | 6/2005 | Campbell et al. | |
| 2005/0133435 A1 | 6/2005 | Niermeyer et al. | |
| 2007/0102924 A1 | 5/2007 | Niermeyer et al. | |
| 2007/0107601 A1 | 5/2007 | Laverdiere et al. | |

FOREIGN PATENT DOCUMENTS

| | | |
|---|---|---|
| DE | 3820675 A1 | 12/1989 |
| DE | 29618092 U1 | 12/1996 |
| DE | 196 18 166 A1 | 11/1997 |
| DE | 197 17 054 A 1 | 11/1998 |
| EP | 0 231 862 A2 | 8/1987 |
| EP | 0 269 054 A2 | 6/1988 |
| EP | 0390 715 A1 | 10/1990 |
| EP | 0 408 375 A2 | 1/1991 |
| EP | 0 492 627 A2 | 7/1992 |
| EP | 0 492 627 A3 | 7/1992 |
| EP | 0535546 A1 | 4/1993 |
| EP | 0 231 862 B1 | 5/1994 |
| EP | 0 616 826 A1 | 9/1994 |
| EP | 0 492 627 B1 | 6/1996 |
| EP | 0 818 228 A1 | 1/1998 |
| EP | 0815928 B1 | 1/1998 |
| EP | 0 887 100 A1 | 12/1998 |
| EP | 1 057 493 A2 | 12/2000 |
| FR | 2 633 368 A1 | 12/1989 |
| FR | 2 745 043 A1 | 8/1997 |
| GB | 344502 | 3/1931 |
| GB | 2 137 110 A | 10/1984 |
| GB | 2 198 430 A | 6/1988 |
| GB | 2 314 516 A | 1/1998 |
| JP | 56-122893 | 2/1980 |
| JP | 57-27588 A | 7/1980 |
| JP | 61-119686 A | 1/1986 |
| JP | 62-234512 A | 10/1987 |
| JP | 63011168 | 1/1988 |
| JP | 7-17434 A | 1/1991 |
| JP | 3-115092 | 11/1991 |
| JP | 417805 | 2/1992 |
| JP | 4094705 | 3/1992 |
| JP | 52793 | 1/1993 |
| JP | 5-154200 | 6/1993 |
| JP | 5-154201 | 6/1993 |
| JP | 6-106164 A | 4/1994 |
| JP | 6-147383 | 5/1994 |
| JP | H6-39008 | 5/1994 |
| JP | 6042921 | 6/1994 |
| JP | 729003 | 4/1995 |
| JP | 7194905 | 8/1995 |
| JP | 7232015 | 9/1995 |
| JP | 7110323 | 11/1995 |
| JP | 8024856 A | 1/1996 |
| JP | 80542465 | 2/1996 |
| JP | 10005746 A | 1/1998 |
| JP | 200077588 | 3/2000 |
| KR | 96-10071 | 4/1996 |
| KR | 96-10072 | 4/1996 |
| WO | WO 93/16315 A1 | 8/1993 |
| WO | WO 01/64312 A1 | 9/2001 |
| WO | WO 01/95993 A2 | 12/2001 |
| WO | WO 02/22232 A1 | 3/2002 |
| WO | WO 03/022388 A2 | 3/2003 |

OTHER PUBLICATIONS

M. E. Clark, "New Photochemical Filtration Technology for Process Improvement," Mykrolis Applications Notes No. MA068, Retrieved from www.mykrolis.com/publications.nsf/search on Jun. 23, 2005.

M. E. Clark, "Understanding the Operating Cycles of Mykrolis Two-Stage Technology Photochemical Dispense Systems," Mykrolis Applications Notes No. MAL111, Retrieved from www.mykrolis. com/publications.nsf/search on Jun. 23, 2005.

Colder Products Company, St. Paul, Minnesota, "CPA Quick Couplings for Plastic Tubing," Form Cp-1, Rev. 2 990; 4 pages, Sep. 1990.

Colder Products Company, St. Paul, Minnesota, "CPA Quick Couplings for Fittings for Plastic Tubing," 3 pages, Sep. 1990.

*Mykrolis Corporation v. Pall Corporation, United States District Court, District of Massachusetts (Boston)* Civil Docket # 1:03-cv-10392-GAO, pp. 1-11, Nov. 17, 2003.

Photoclean EZD, *Filtration of Photoresist, Organic Solvents, Developing Solution and Purified Water*, PALL, 1 page w/translation, Sep. 2, 1999.

Memorandum and Order dated Apr. 30, 2004, *Mykrolis Corporation v. Pall Corporation, United States District Court, District of Massachusetts (Boston)* Civil Docket # 1:03-10392-GAO, pp. 1-22.

Clarke, Michael E., "Improving Photolithography Equipment OEE with the Impact® ST Manifold," Mykrolis Applications Notes, Lit. No. MAL 109, Mar. 1999.

Exhibit 5, Pall's Preliminary Claim Chart Correlating Claim 3 of the '770 Patent to the Sumitomom '200 Publication, Aug. 2, 2004.

Exhibit 6, Pall's Preliminary Claim Chart Correlating Claim 1 of the '907 Patent to the Sumitomom '200 Publication, Aug. 2, 2004.

Exhibit 7, Pall's Preliminary Claim Chart Correlating Claim 3 of the '770 Patent to the Sumitomo '201 Publication, Aug. 2, 2004.

Pall Corporation's Notification of Additional Highly Significant Prior Art Impacting the Validity of the Mykrolis Patents and Request for *Sua Sponte* Dissolution of Preliminary Injunction, *Mykrolis v. Pall Corporation, United States District Court, District of Massachusetts* (Boston) Civil Docket No. 03-10392-GAO, dated Aug. 2, 2004.

Photograph of EZD-3 slotless retrofit manifold (slide-in version), Pall Production No. P011673, Oct. 26, 2004.

Photograph of EZD-3 slotless retrofit manifold (bolt-on version), Pall Production No. P011674, Oct. 26, 2004.

*Mykrolis Corporation v. Pall Corporation, United States District Court, District of Massachusetts (Boston)*, Civil Action No.: 03-10392-GAO, Memorandum and Order dated Jan. 12, 2005.

Photograph of Sumitomo Oxygen Concentrator for Medical Treatment Use, MO-2000, Feb. 1993 (along with an English-language translation) (15 pages).

Photographs of MO-2000 Medical Oxygen Generator, as sold beginning in Feb. 1993 (4 pages).

Statement of Kuzukiyo Takano, Oct. 20, 2004 (along with an English-language translation).

Millipore Corporation, "Wafergard™ Photoresist Filtration System," pp. 1-9, (Jun. 1983).

European Opposition Division decision to revoke European Patent EP-B-818228, (May 2, 2006).

Pall's Opposition to Entegris' Motion for Preliminary Injunction, *Entegris, Inc. v. Pall Corporation, United States District Court for the District of Massachusetts*, Civil Action No. 06-10601 GAO, pp. 1-52, (Jun. 1, 2006).

Declaration of Professor Igor Paul, pp. 1-29, Exhibit 5 to Pall Corporation's Opposition to Entegris' Motion for Preliminary Injunction filed Jun. 1, 2006, Civil Action No. 06-10601 GAO.

Exhibit G, to Declaration of Professor Igor Paul, Exhibit 5 to Pall Corporation's Opposition to Entegris'0 Motion for Preliminary Imjunction filed Jun. 1, 2006, Civil Action No. 06-10601 GAO.

Exhibit R, to Declaration of Professor Igor Paul, Exhibit 5 to Pall Corporation's Opposition to Entegris'0 Motion for Preliminary Imjunction filed Jun. 1, 2006, Civil Action No. 06-10601 GAO.

Exhibit S, to Declaration of Professor Igor Paul, Exhibit 5 to Pall Corporation's Opposition to Entegris'0 Motion for Preliminary Injunction filed Jun. 1, 2006, Civil Action No. 06-10601 GAO.

Exhibit T, to Declaration of Professor Igor Paul, Exhibit 5 to Pall Corporation's Opposition to Entegris'0 Motion for Preliminary Injunction filed Jun. 1, 2006, Civil Action No. 06-10601 GAO.

Exhibit U, to Declaration of Professor Igor Paul, Exhibit 5 to Pall Corporation's Opposition to Entegris'0 Motion for Preliminary Injunction filed Jun. 1, 2006, Civil Action No. 06-10601 GAO.

Exhibit V, to Declaration of Professor Igor Paul, Exhibit 5 to Pall Corporation's Opposition to Entegris'0 Motion for Preliminary Injunction filed Jun. 1, 2006, Civil Action No. 06-10601 GAO.

Exhibit W, to Declaration of Professor Igor Paul, Exhibit 5 to Pall Corporation's Opposition to Entegris'0 Motion for Preliminary Injunction filed Jun. 1, 2006, Civil Action No. 06-10601 GAO.

Exhibit X, to Declaration of Professor Igor Paul, Exhibit 5 to Pall Corporation's Opposition to Entegris'0 Motion for Preliminary Injunction filed Jun. 1, 2006, Civil Action No. 06-10601 GAO.

Exhibit Y, to Declaration of Professor Igor Paul, Exhibit 5 to Pall Corporation's Opposition to Entegris'0 Motion for Preliminary Injunction filed Jun. 1, 2006, Civil Action No. 06-10601 GAO.

Declaration of Stephen Geibel, Exhibit 6 to Pall Corporation's Opposition to Entegris'0 Motion for Preliminary Injunction filed Jun. 1, 2006, Civil Action No. 06-10601 GAO.

Exhibit F, to Declaration of Stephen Geibel, Exhibit 6 to Pall Corporation's Opposition to Entegris'0 Motion for Preliminary Injunction filed Jun. 1, 2006, Civil Action No. 06-10601 GAO.

Exhibit G, to Declaration of Stephen Geibel, Exhibit 6 to Pall Corporation's Opposition to Entegris'0 Motion for Preliminary Injunction filed Jun. 1, 2006, Civil Action No. 06-10601 GAO.

Declaration of Michael Mesawich, Exhibit 7 to Pall Corporation's Opposition to Entegris'0 Motion for Preliminary Injunction filed Jun. 1, 2006, Civil Action No. 06-10601 GAO.

Exhibit A, to Declaration of Michael Mesawich, Exhibit 7 to Pall Corporation's Opposition to Entegris'0 Motion for Preliminary Injunction filed Jun. 1, 2006, Civil Action No. 06-10601 GAO.

Declaration of Dan Jenkins, Exhibit 8 to Pall Corporation's Opposition to Entegris'0 Motion for Preliminary Injunction filed Jun. 1, 2006, Civil Action No. 06-10601 GAO.

Exhibit B, to Declaration of Dan Jenkins, Exhibit 8 to Pall Corporation's Opposition to Entegris'0 Motion for Preliminary Injunction filed Jun. 1, 2006, Civil Action No. 06-10601 GAO.

Exhibit C, to Declaration of Dan Jenkins, Exhibit 8 to Pall Corporation's Opposition to Entegris'0 Motion for Preliminary Injunction filed Jun. 1, 2006, Civil Action No. 06-10601 GAO.

Exhibit D, to Declaration of Dan Jenkins, Exhibit 8 to Pall Corporation's Opposition to Entegris'0 Motion for Preliminary Injunction filed Jun. 1, 2006, Civil Action No. 06-10601 GAO.

Exhibit E, to Declaration of Dan Jenkins, Exhibit 8 to Pall Corporation's Opposition to Entegris'0 Motion for Preliminary Injunction filed Jun. 1, 2006, Civil Action No. 06-10601 GAO.

Exhibit F, to Declaration of Dan Jenkins, Exhibit 8 to Pall Corporation's Opposition to Entegris'0 Motion for Preliminary Injunction filed Jun. 1, 2006, Civil Action No. 06-10601 GAO.

Exhibit G, to Declaration of Dan Jenkins, Exhibit 8 to Pall Corporation's Opposition to Entegris'0 Motion for Preliminary Injunction filed Jun. 1, 2006, Civil Action No. 06-10601 GAO.

Exhibit H, to Declaration of Dan Jenkins, Exhibit 8 to Pall Corporation's Opposition to Entegris'0 Motion for Preliminary Injunction filed Jun. 1, 2006, Civil Action No. 06-10601 GAO.

Exhibit I, to Declaration of Dan Jenkins, Exhibit 8 to Pall Corporation's Opposition to Entegris'0 Motion for Preliminary Injunction filed Jun. 1, 2006, Civil Action No. 06-10601 GAO.

Exhibit J, to Declaration of Dan Jenkins, Exhibit 8 to Pall Corporation's Opposition to Entegris'0 Motion for Preliminary Injunction filed Jun. 1, 2006, Civil Action No. 06-10601 GAO.

Exhibit K, to Declaration of Dan Jenkins, Exhibit 8 to Pall Corporation's Opposition to Entegris'0 Motion for Preliminary Injunction filed Jun. 1, 2006, Civil Action No. 06-10601 GAO.

Exhibit L, to Declaration of Dan Jenkins, Exhibit 8 to Pall Corporation's Opposition to Entegris'0 Motion for Preliminary Injunction filed Jun. 1, 2006, Civil Action No. 06-10601 GAO.

Exhibit M, to Declaration of Dan Jenkins, Exhibit 8 to Pall Corporation's Opposition to Entegris'0 Motion for Preliminary Injunction filed Jun. 1, 2006, Civil Action No. 06-10601 GAO.

Exhibit N, to Declaration of Dan Jenkins, Exhibit 8 to Pall Corporation's Opposition to Entegris'0 Motion for Preliminary Injunction filed Jun. 1, 2006, Civil Action No. 06-10601 GAO.

Declaration of Frank Zugelter, Exhibit 9 to Pall Corporation's Opposition to Entegris'0 Motion for Preliminary Injunction filed Jun. 1, 2006, Civil Action No. 06-10601 GAO.

Exhibit B, to Declaration of Frank Zugelter, Exhibit 9 to Pall Corporation's Opposition to Entegris'0 Motion for Preliminary Injunction filed Jun. 1, 2006, Civil Action No. 06-10601 GAO.

Exhibit C, to Declaration of Frank Zugelter, Exhibit 9 to Pall Corporation's Opposition to Entegris'0 Motion for Preliminary Injunction filed Jun. 1, 2006, Civil Action No. 06-10601 GAO.

Exhibit D, to Declaration of Frank Zugelter, Exhibit 9 to Pall Corporation's Opposition to Entegris'0 Motion for Preliminary Injunction filed Jun. 1, 2006, Civil Action No. 06-10601 GAO.

Exhibit E, to Declaration of Frank Zugelter, Exhibit 9 to Pall Corporation's Opposition to Entegris'0 Motion for Preliminary Injunction filed Jun. 1, 2006, Civil Action No. 06-10601 GAO.

Exhibit F, to Declaration of Frank Zugelter, Exhibit 9 to Pall Corporation's Opposition to Entegris'0 Motion for Preliminary Injunction filed Jun. 1, 2006, Civil Action No. 06-10601 GAO.

Exhibit G, to Declaration of Frank Zugelter, Exhibit 9 to Pall Corporation's Opposition to Entegris'0 Motion for Preliminary Injunction filed Jun. 1, 2006, Civil Action No. 06-10601 GAO.

Pall's Revised Opposition to Entergris' Motion for Preliminary Injunction, *Entegris, Inc.* v. *Pall Corporation, United States District Court for the District of Massachusetts*, Civil Action No. 06-10601 GAO, pp. 1-49, (Jun. 16, 2006).

Entegris's Reply Brief in Support of Its Motion for Preliminary Injunction, *Entegris, Inc.* v. *Pall Corporation, United States District Court for the District of Massachusetts*, Civil Action No. 06-10601 GAO, pp. 1-46, (Jun. 22, 2006).

Affidavit of Michael Clarke in Support for Motion for Preliminary Injunction, *Entegris, Inc.* v. *Pall Corporation, United States District Court for the District of Massachusetts*, filed Jun. 22, 2006, Civil Action No. 06-10601 GAO.

Supplemental Affidavit of Samir Nayfeh in Support for Motion for Preliminary Injunction, *Entegris, Inc.* v. *Pall Corporation, United States District Court for the District of Massachusetts*, filed Jun. 22, 2006, Civil Action No. 06-10601 GAO.

Pall's Sur-Reply in Opposition to Entegris' Motion for Preliminary Injunction, *Entegris, Inc.* v. *Pall Corporation, United States District Court for the District of Massachusetts*, filed Jul. 7, 2006, Civil Action No. 06-10601 GAO.

Exhibit 13 to Supplemental Declaration of Professor Igor Paul to Pall Corporation's Sur-Reply in Opposition to Entegris' Motion for Preliminary Injunction, *Entegris, Inc.* v. *Pall Corporation, United States District Court for the District of Massachusetts*, filed Jul. 7, 2006, Civil Action No. 06-10601 GAO.

Exhibit AD to Supplemental Declaration of Professor Igor Paul, Exhibit 13, Part 1 to Pall Corporation's Sur-Reply in Opposition to Entegris' Motion for Preliminary Injunction, *Entegris, Inc.* v. *Pall Corporation, United States District Court for the District of Massachusetts*, filed Jul. 7, 2006, Civil Action No. 06-10601 GAO.

Exhibit AD to Supplemental Declaration of Professor Igor Paul, Exhibit 13, Part 2 to Pall Corporation's Sur-Reply in Opposition to Entegris' Motion for Preliminary Injunction, *Entegris, Inc.* v. *Pall Corporation, United States District Court for the District of Massachusetts*, filed Jul. 7, 2006, Civil Action No. 06-10601 GAO.

Exhibit AE to Supplemental Declaration of Professor Igor Paul, Exhibit 13, to Pall Corporation's Sur-Reply in Opposition to Entegris' Motion for Preliminary Injunction, *Entegris, Inc.* v. *Pall Corporation, United States District Court for the District of Massachusetts*, filed Jul. 7, 2006, Civil Action No. 06-10601 GAO.

Exhibit AF to Supplemental Declaration of Professor Igor Paul, Exhibit 13, to Pall Corporation's Sur-Reply in Opposition to Entegris' Motion for Preliminary Injunction, *Entegris, Inc.* v. *Pall Corporation, United States District Court for the District of Massachusetts*, filed Jul. 7, 2006, Civil Action No. 06-10601 GAO.

Supplemental Declaration of Stephen A. Geibel, Exhibit 14 to Pall Corporation's Sur-Reply in Opposition to Entegris' Motion for Preliminary Injunction, *Entegris, Inc.* v. *Pall Corporation, United States District Court for the District of Massachusetts*, filed Jul. 7, 2006, Civil Action No. 06-10601 GAO.

Exhibit I to Supplemental Declaration of Stephen A. Geibel, Exhibit 14 to Pall Corporation's Sur-Reply in Opposition to Entegris' Motion for Preliminary Injunction, *Entegris, Inc.* v. *Pall Corporation, United States District Court for the District of Massachusetts*, filed Jul. 7, 2006, Civil Action No. 06-10601 GAO.

Exhibit J to Supplemental Declaration of Stephen A. Geibel, Exhibit 14 to Pall Corporation's Sur-Reply in Opposition to Entegris' Motion for Preliminary Injunction, *Entegris, Inc.* v. *Pall Corporation, United States District Court for the District of Massachusetts*, filed Jul. 7, 2006, Civil Action No. 06-10601 GAO.

Exhibit K to Supplemental Declaration of Stephen A. Geibel, Exhibit 14 to Pall Corporation's Sur-Reply in Opposition to Entegris' Motion for Preliminary Injunction, *Entegris, Inc.* v. *Pall Corporation, United States District Court for the District of Massachusetts*, filed Jul. 7, 2006, Civil Action No. 06-10601 GAO.

Exhibit L to Supplemental Declaration of Stephen A. Geibel, Exhibit 14 to Pall Corporation's Sur-Reply in Opposition to Entegris' Motion for Preliminary Injunction, *Entegris, Inc.* v. *Pall Corporation, United States District Court for the District of Massachusetts*, filed Jul. 7, 2006, Civil Action No. 06-10601 GAO.

Exhibit M to Supplemental Declaration of Stephen A. Geibel, Exhibit 14 to Pall Corporation's Sur-Reply in Opposition to Entegris' Motion for Preliminary Injunction, *Entegris, Inc.* v. *Pall Corporation, United States District Court for the District of Massachusetts*, filed Jul. 7, 2006, Civil Action No. 06-10601 GAO.

Excerpts from Entegris Appeal Brief, Exhibit 15 to Pall Corporation's Sur-Reply in Opposition to Entegris' Motion for Preliminary Injunction, *Entegris, Inc.* v. *Pall Corporation, United States District Court for the District of Massachusetts*, filed Jul. 7, 2006, Civil Action No. 06-10601 GAO.

Family Tree of the '667 Patent, Exhibit 16 to Pall Corporation's Sur-Reply in Opposition to Entegris' Motion for Preliminary Injunction, *Entegris, Inc.* v. *Pall Corporation, United States District Court for the District of Massachusetts*, filed Jul. 7, 2006, Civil Action No. 06-10601 GAO.

Entegris, Inc.'s Response to Pall Corporation's Sur-Reply, *Entegris, Inc.* v. *Pall Corporation, United States District Court for the District of Massachusetts*, filed Jul. 14, 2006, Civil Action No. 06-10601 GAO, pp 1-8.

Second Supplemental Affidavit of Samir Nayfeh in Support for Motion for Preliminary Injunction, *Entegris, Inc.* v. *Pall Corporation, United States District Court for the District of Massachusetts*, filed Jul. 14, 2006, Civil Action No. 06-10601 GAO, pp. 1-4..

Supplemental Affidavit of Michael Clarke in Support for Motion for Preliminary Injunction, *Entegris, Inc.* v. *Pall Corporation, United States District Court for the District of Massachusetts*, filed Jul. 14, 2006, Civil Action No. 06-10601 GAO, pp. 1-4..

Tritec Industries, Mountain View, California, "The Ultimate Pump-TF: For Precise Dispensing of Materials Requiring a Non-Metallic Fluid Path," 4 pages, date unknown, but at least as early as Sep. 28, 2006.

\* cited by examiner

LIQUID FILTRATION DEVICE

RELATED APPLICATIONS

This application claims priority to and is a continuation of U.S. application Ser. No. 11/591,283, filed Nov. 1, 2006, issued on Aug. 5, 2008 as U.S. Pat. No. 7,407,594, which is a continuation of U.S. application Ser. No. 11/281,102, filed Nov. 16, 2005, now abandoned, which is a continuation of U.S. application Ser. No. 11/019,966, filed Dec. 21, 2004, issued on Jan. 3, 2006 as U.S. Pat. No. 6,982,041, which is a divisional of U.S. application Ser. No. 10/380,314, filed Mar. 12, 2003, issued on Jan. 25, 2005, as U.S. Pat. No. 6,846,409, which is the U.S. National Stage of International Application No. PCT/US01/028771, filed Sep. 13, 2001, published in English, which claims the benefit of U.S. Application No. 60/232,209, filed on Sep. 13, 2000. The entire teachings of the above applications are incorporated herein by reference.

BACKGROUND OF THE INVENTION

The IMPACT® LVHD filter, sold by Mykrolis Corporation of Bedford, Mass., has a low hold up volume which is very advantageous due to the high cost of the process fluids principally filtered by the device: photoresist, dielectrics, anti-reflectives and optical disc materials. The IMPACT LHVD filter provides superior filtration to prevent debris in the process fluid from being deposited onto the substrate and from causing defects.

A sectional view of the current IMPACT filter may be found in FIG. 1. FIG. 1 provides a device that uses three independent connections, a vent 12, a feed 14, and an outlet 16, that can interface with either a stand alone manifold or directly to a dispense system such as the RGEN™ or Intelli-Gen® dispense systems that are manufactured by Mykrolis Corporation. The process fluid enters through the inlet port 14 and flows through the inlet tube 24 to the housing bottom 25. The process fluid then flows through the vertical membrane filter 26 to the outlet port 16, where the purified fluid is directed back to the manifold or dispense system. The vent port 12 allows bubbles that accumulate on the upstream side of the filter to exit the housing 22. To better eliminate bubbles from the filter, the top surface of the housing cap 18 is set at an angle directed up to the vent port 12. This allows air bubbles to gradually rise to the highest point in the housing 20 and to exit the housing 22.

A more detailed description of the attributes and benefits of the IMPACT LHVD filter may be found in Mykrolis Applications Note No. MA068 entitled "New Photochemical Filtration Technology for Process Improvement" by M. Clarke and Kwok-Shun Cheng. This paper was originally presented at the INTERFACE '97 Poster Session on Nov. 10, 1997. Also, benefits of the IMPACT LHVD are presented in Mykrolis Applications Note No. MAL109 entitled "Improving Photolithography Equipment OEE with the IMPACT ST Manifold" by M. Clarke.

Although the design and performance of the IMPACT LHVD filter is much improved over other filtration devices, it is also not fully optimized for bubble venting. In the IMPACT LHVD filter, bubble-laden fluid is forced to the bottom of the device to sweep the bottom with fluid to prevent fluid stagnation at the bottom and the formation of gel particles. Therefore, any entrained bubbles must then rise to the vent. Again, the slowly rising bubbles from the bottom will require more time and chemical to purge them from the device.

To compensate for the shortcomings of filters and how they are used in standard filtration and dispense systems, Mykrolis developed integrated filtration and dispense systems called "Two Stage Technology" or "TST". The designs of these TST systems allow for recirculation of bubble-laden fluid to minimize the amount of fluid that is wasted during start-up of a new filter. Although these systems more efficiently remove bubbles from the filter and conserve fluid, waste is still generated, as the venting process is not optimized.

A more detailed description of the operation of a Two Stage Technology System is given in Mykrolis Applications Note No. MAL111 entitled "Understanding the Operating Cycles of Millipore Two-Stage Technology Photochemical Dispense Systems" by M. Clarke.

For all of these systems (even including TST systems), bubble venting is still not optimized as the venting process release not just bubbles but a bubble saturated fluid stream. Since bubbles do not rise quickly in many process fluids, the motion of the fluid toward the vent is required to remove the bubbles (effectively, the bubbles are carried along by the fluid stream). In addition, the smaller the bubbles to be removed, the more fluid that is ejected in the stream.

It is apparent from the aforementioned applications notes and discussions that gas bubbles are a concern to semiconductor manufacturers. However, the current IMPACT filter or any other currently available product, inadequately addresses the need to sweep bubbles from all surfaces of the filtration device as well as to initiate bubble removal prior to filtration.

Accordingly, it would be desirable to provide a liquid filtration device wherein bubble removal from the liquid being filtered be initiated prior to filtration so that the gas bubbles removed are positioned near the vent, thereby facilitating gas bubble removal from the liquid being filtered. Also, it would be desirable to have the system to provide a means for automatic venting of a liquid filtration device that minimizes the amount of fluid loss.

SUMMARY OF THE INVENTION

The present invention provides a device that eliminates gas bubbles from a fluid by using the fluid's velocity within the device, coupled with specific flow channels, to remove pockets of gas from liquid filtration devices. The properly designed flow paths direct fluid into locations where gas bubbles will most likely collect.

The present invention provides a device and method for eliminating gas bubbles from a liquid within a housing having a housing cover that will allow for faster and more efficient removal of entrained bubbles. The new device and method uses a portion of the fluid's velocity at the device inlet to sweep around the underside of a flange of a filter cartridge within the device. This will force gas bubbles within the fluid to rise above the filter membrane and adjacent the inside surface of the housing cover. The liquid streams positioned beneath the filter cartridge's flange then converge to the inside surface of the housing cover and proceed to force gas bubbles from the fluid to proceed toward the vent port of the device.

In addition, the present invention provides a method for effecting automatic venting of bubbles from the fluid being filtered.

It is an object of the present invention to provide a liquid filtration device that eliminates gas bubbles from fluid within the device during a vent cycle.

It is also an object of the present invention to provide a liquid filtration device that removes gas bubbles from a fluid by utilizing surfaces in the device while the device is operated in a filtration cycle.

BRIEF DESCRIPTION OF THE DRAWINGS

FIG. 4b is an underside view of the device of FIG. 4a.

FIG. 6b is an underside view of the device of FIG. 6a.

DETAILED DESCRIPTION OF THE INVENTION

Figure 1:
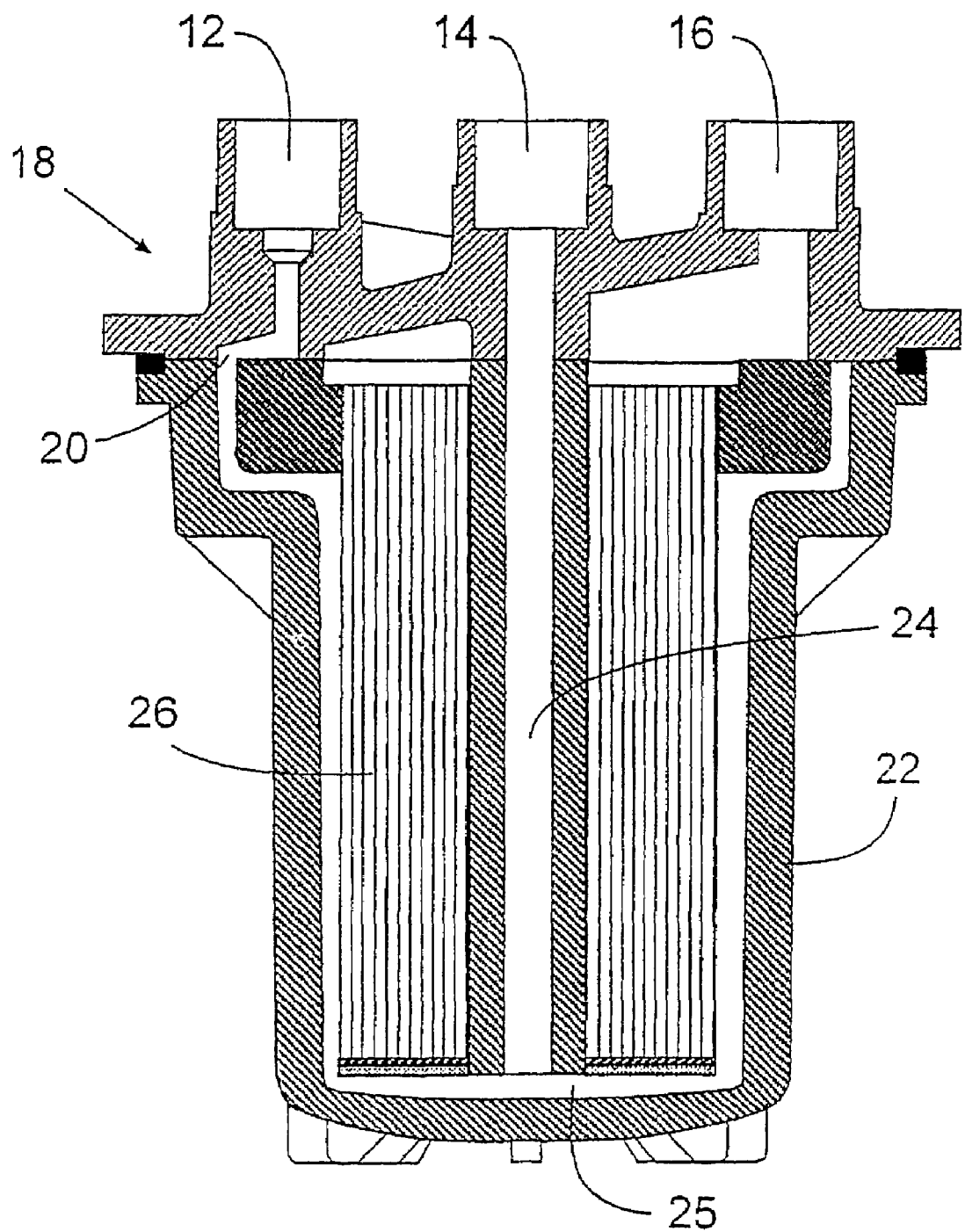
FIG. 1 is a representation of the prior art, a sectional view of an IMPACT LHVD filter.

The flow direction of both bubbles removed from fluid being filtered and the filtered fluid within the filtration device of this invention depends upon the mode in which the device is being operated. The filtration device of this invention can be operated with the vent either open or closed. In an initial operating mode of the filtration device, the filtration device is filled with fluid and additional fluid is pumped through the device with the vent open to remove the majority of gas and bubbles from the device. During this mode of operation, bubble-laden fluid is also passed through the vent. Subsequent to this initial mode of operation, the vent is closed and the fluid being filtered is pumped through the filter device of this invention. During this mode, bubbles are constantly separated from the fluid being filtered and are collected at or near the vent. In a preferred mode of operation, fluid is recirculated through the filtration device for a period of time to assure complete or substantially complete gas removal from the pores of the filter to minimize the amount of fluid that is wasted. At specific intervals, the vent is opened and bubbles are expelled from the filtration device. The vent then is closed and bubble-free fluid can be dispensed to a point of use. After some period of time, the device will collect additional bubbles and another vent operation is needed. Again, bubbles and fluid will be expelled through the vent.

The bubbles entrained within the fluid are forced from the fluid along one of two locations within the filtration device. A first channel is positioned in a housing cover of the filtration device and is positioned to be in direct fluid communication with the vent. A second channel is positioned in a top cap above the filter membrane of the filtration device and is positioned to be in direct fluid communication with the first channel. The first channel accumulates bubbles from the fluid as the fluid enters the filtration device. The first channel also is positioned to accept bubbles recovered in the second channel. The second channel accumulates any bubbles that either collect or form on the upstream side of the filtration membrane of the filtration device. Thus, the filtration device recovers bubbles which are immediately released from the fluid upon entering the filtration device and which are released from the fluid prior to filtration.

The present invention provides a liquid filtration device with internal flow paths that facilitate the removal of air bubbles therefrom, the device comprising a housing, said housing including a bowl; a cap and a cover, the cover having internal and external surfaces and characterized by apertures therein that serve as fluid inlet, outlet and a vent, whereby said cap, cover and bowl are combined in such a manner that fluid channels are created, such channels facilitating sweeping bubbles out of the device and toward the vent, said channels including a fluid channel that directs fluid toward that portion of the housing where the vent is located; a fluid channel that directs fluid to sweep the bottom of the bowl; and a fluid channel that directs fluid to sweep the undersurface of the cap.

In a preferred embodiment, the device is designed so that the inlet and vent fluid flow path cross-sectional areas are controlled in a manner such that an optimal fluid velocity is achieved for bubble removal and separation, thereby increasing the efficiency of bubble removal.

In a preferred embodiment, the underside of said top cap has a sloping surface, said sloping surface having a nadir and zenith which is utilized during venting and filtration cycles as well as between cycles. Such a sloping surface will facilitate removal of bubble from the device. Preferably, the surface zenith is juxtaposed to the vent aperture so the bubbles are more efficiently removed from the fluid.

In a preferred embodiment, vent paths will converge at or near the nadir of the volume between the cap and the cover. It is understood that this volume will be where air bubbles to be purged will congregate. Preferably for this embodiment, the surface zenith is juxtaposed to the vent aperture so the bubbles are more efficiently removed.

In a preferred embodiment of the present invention, the internal surface of the cover will have a vent ridge, the zenith of said vent ridge positioned substantially near the vent aperture.

In another preferred embodiment, the vent is located directly above a vent aperture while restricting the vent fluid path to maintain fluid velocity to force gas from the fluid.

In another preferred embodiment, the vent process is automatically controlled such that minimal fluid is lost during the vent process.

The present invention provides a method of removing air bubbles from a device intended to filter fluid, said device including an inlet, outlet and vent and said device characterized by being subjected to filtration and vent processes, the method comprising providing fluid channels that are swept during filtration and vent processes. Fluid channels are provided that facilitate the sweeping of air bubbles from the surfaces of the device towards a vent, whereby use of the device in either filtration or venting will remove air bubbles from the device.

Figure 2A:
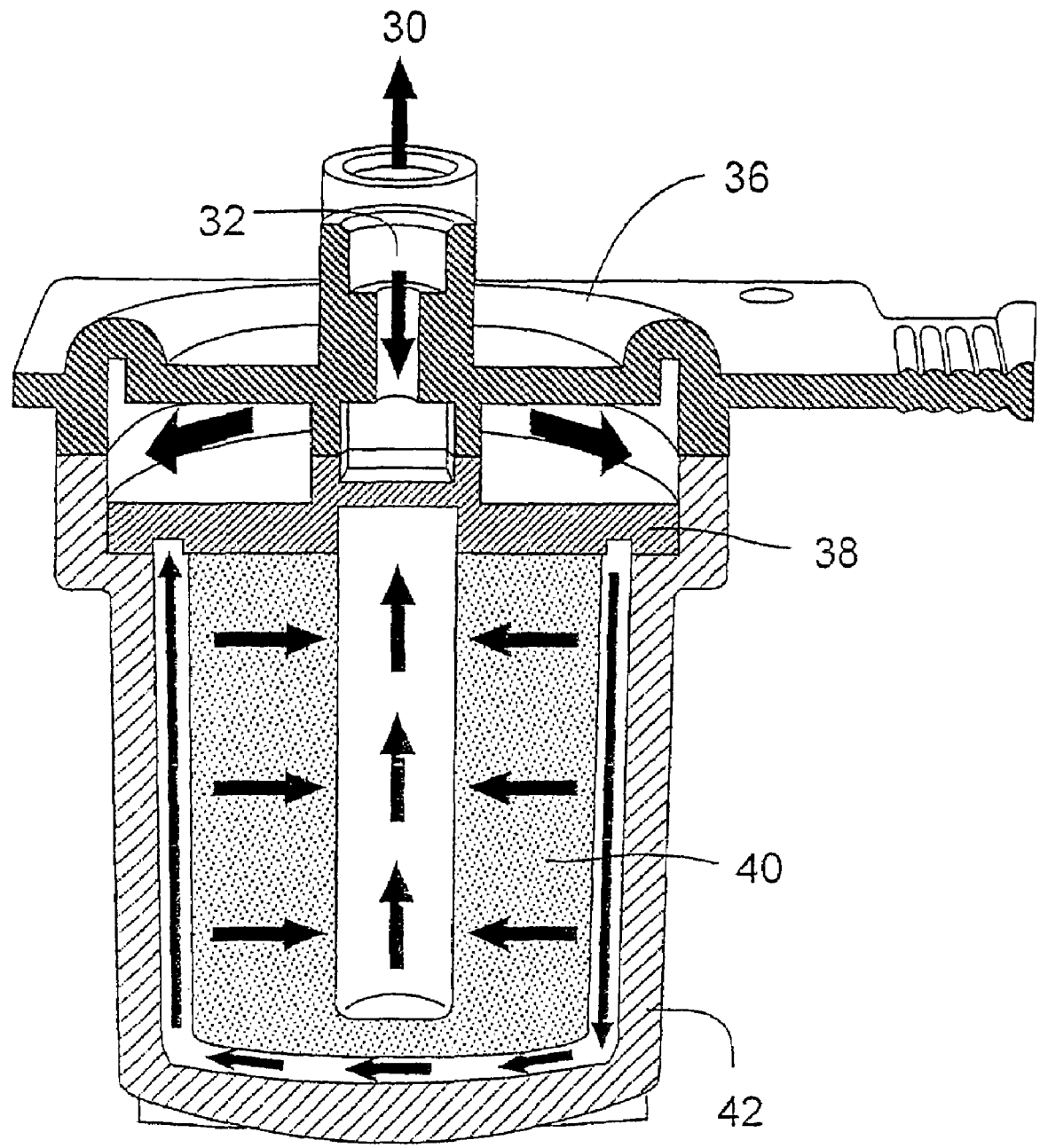
FIGS. 2a and 2b are cross-sectional views of the filtration device of the present invention with arrows representing fluid flow paths.
Figure 2B:
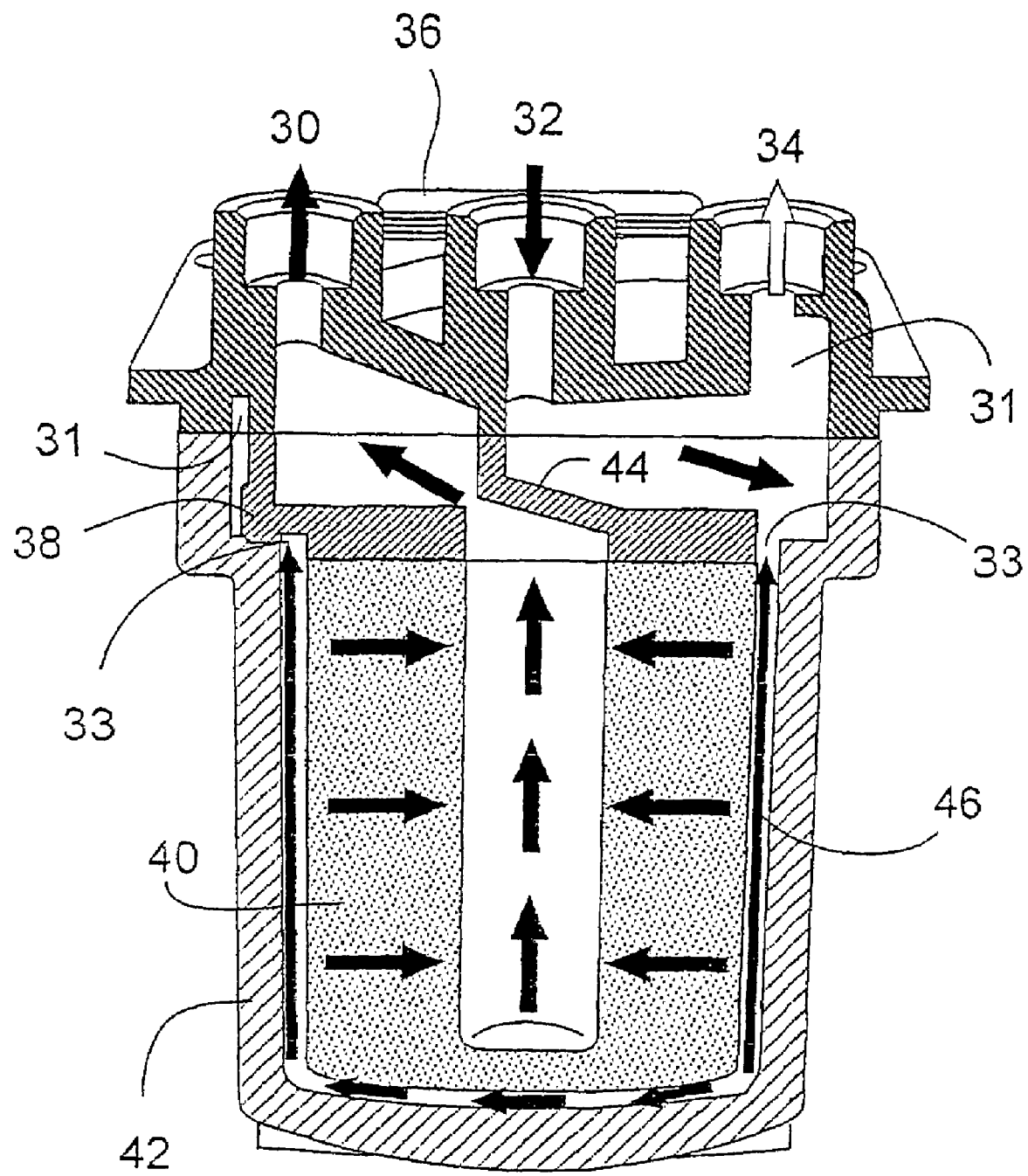

Referring to FIGS. 2a and 2b, a device of the present invention includes an outlet 30, an inlet 32 and a vent 34 that are formed from the housing cover 36. The housing cover 36 is fitted to the top cap 38 and housing bowl 42. Filter media 40 is contained within the housing bowl 42. The arrows indicate how fluid will flow in the device. Diverter 44 alters the fluid flow path from the inlet towards the vent 34. When the filtration device is filtering fluid, the majority of the fluid will pass directly from the inlet 32 to the housing bowl 42 while depositing air bubbles in the vicinity of the vent 34. The housing cover 36 is provided with a first channel 31 which extends about the entire or substantially entire circumference of housing cover 36 and provides a pathway for gas and bubbles to be directed to vent 34. The top cap 38 is provided with a second channel 33 which extends substantially the entire circumference of top cap 38 and provides a pathway for gas from inlet fluid to be directed into the first channel 31 and then through vent 34.

Figure 3A:
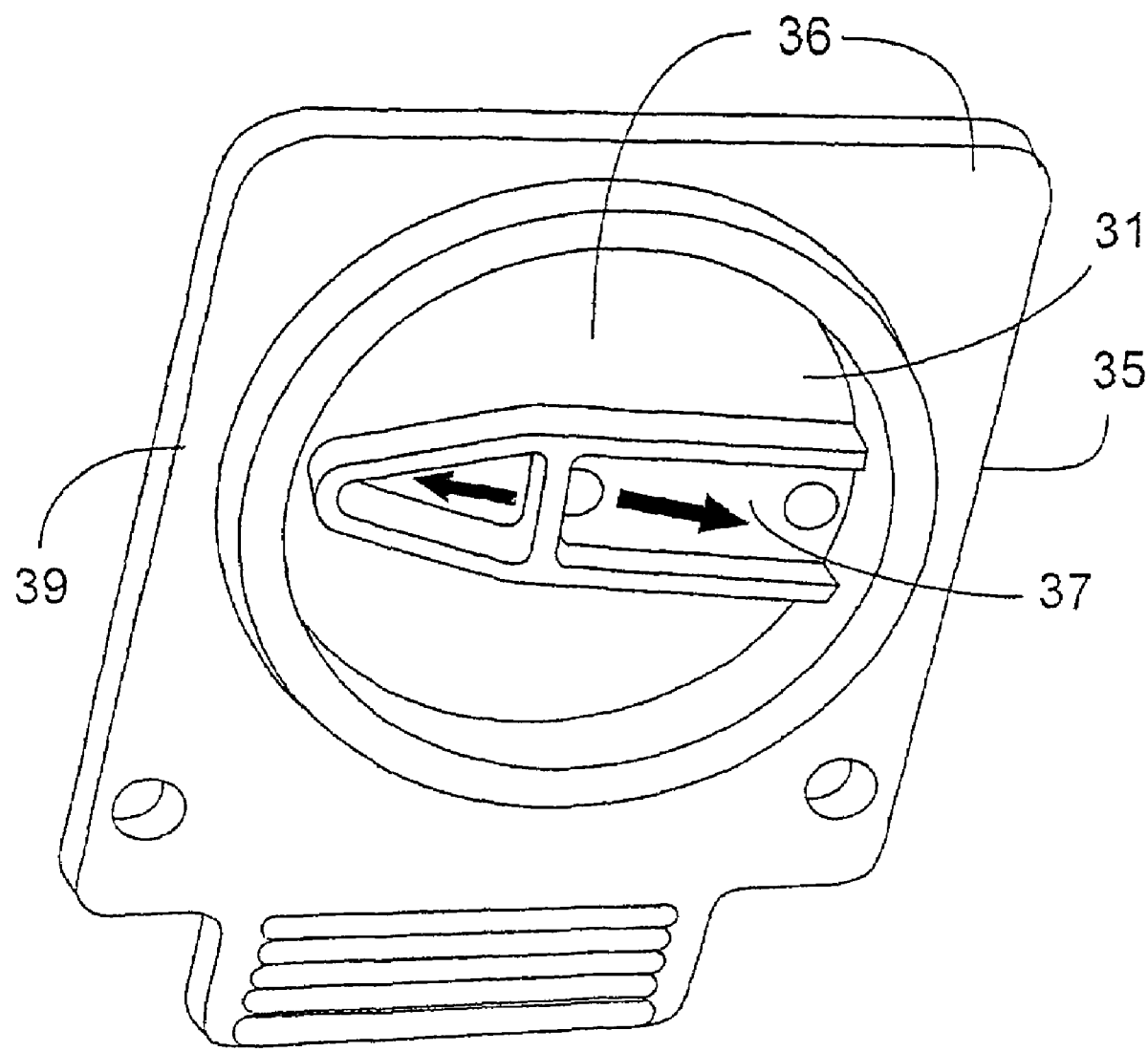
FIG. 3a is a view of the underside of the top cap of the filtration device of this invention.
Figure 3B:
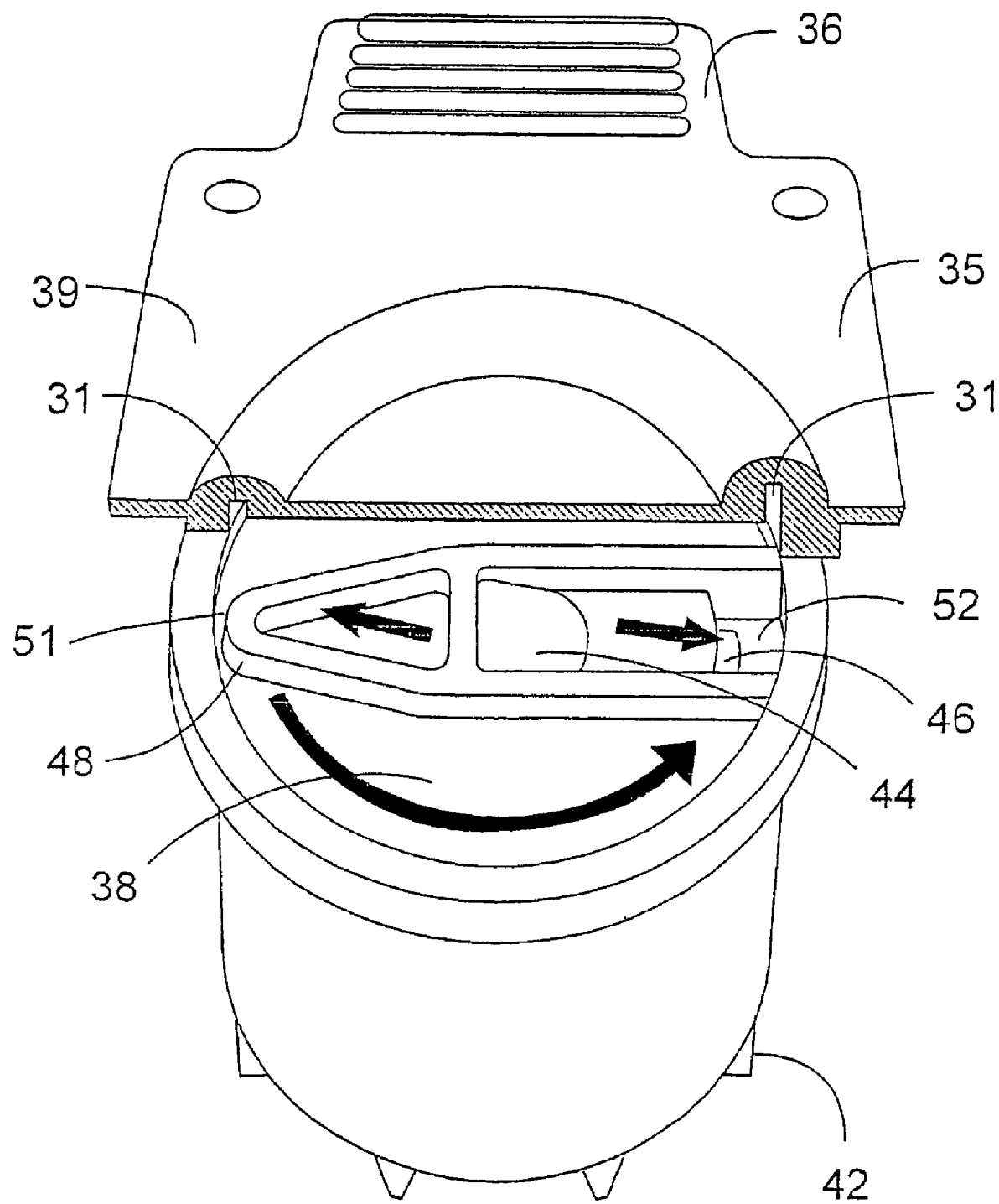
FIG. 3b is a partial cross sectional view of the top cap of FIG. 3a positioned relative to a cap on the filter cartridge of this invention.

Referring to FIGS. 3a and 3b, the housing cover 36 has its internal surface 37 angled towards the vent side 35 of the housing cover 36. The first channel 31 spirals up from the outlet side 39 of the housing cover 36 to the vent 34 (FIG. 2b) to remove all additional gas bubbles.

Also, as shown in FIGS. 3a and 3b, inlet fluid is redirected from the center of the housing to the side of the housing by the diverter 44 where the vent 34 (FIG. 2b) is located for this particular design. This configuration forces bubble-laden fluid from the inlet 32 (FIG. 2b) to travel towards the vent 34 (FIG. 2b). By controlling the cross-sectional area, the fluid velocity can be regulated such that buoyant forces and residence time are optimized for efficient bubble removal. The fluid then travels down the side fluid channel 46.

Figure 4A:
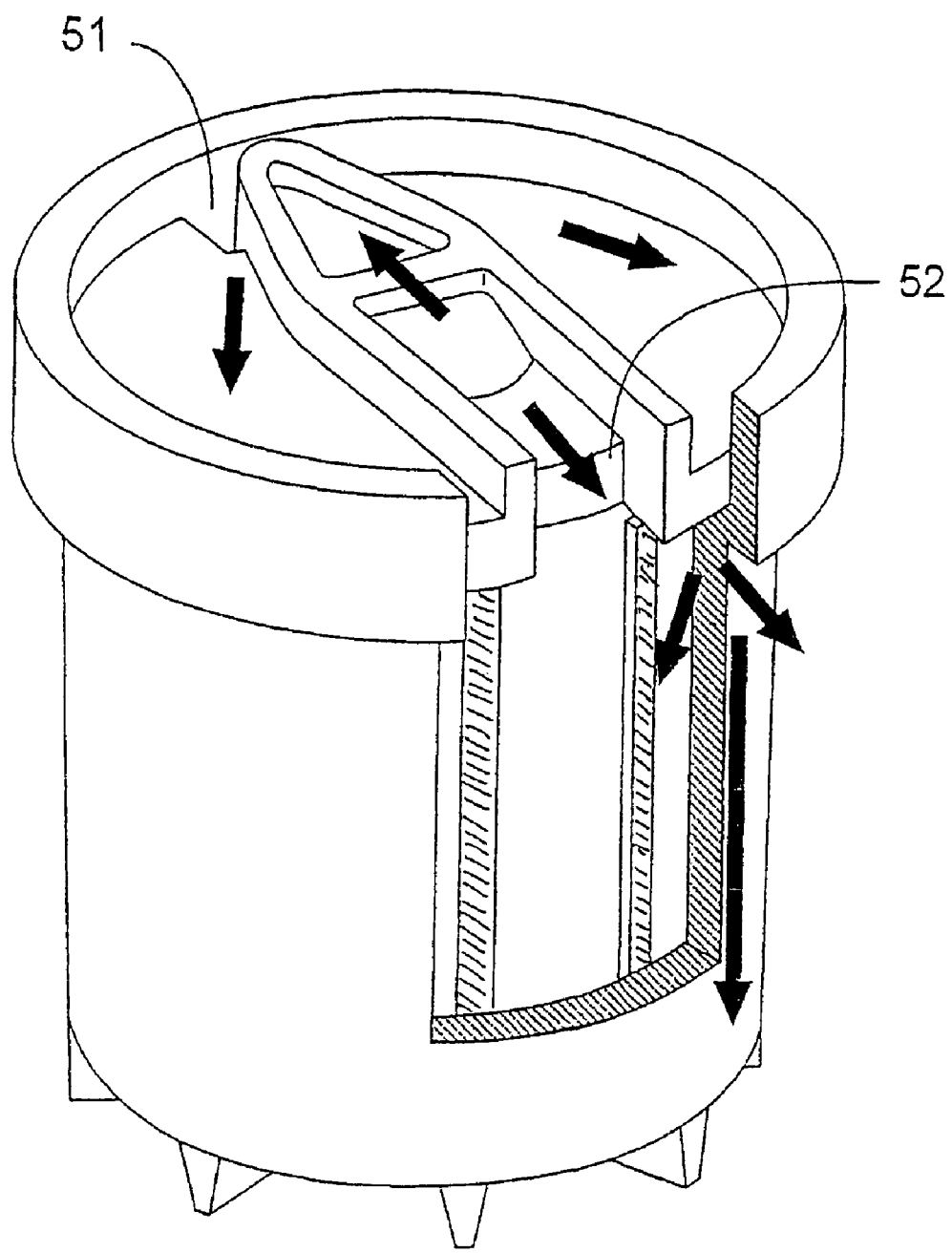
FIG. 4a is a partial sectional view of the present invention which shows fluid channels with arrow representing fluid flow paths.
Figure 4B:
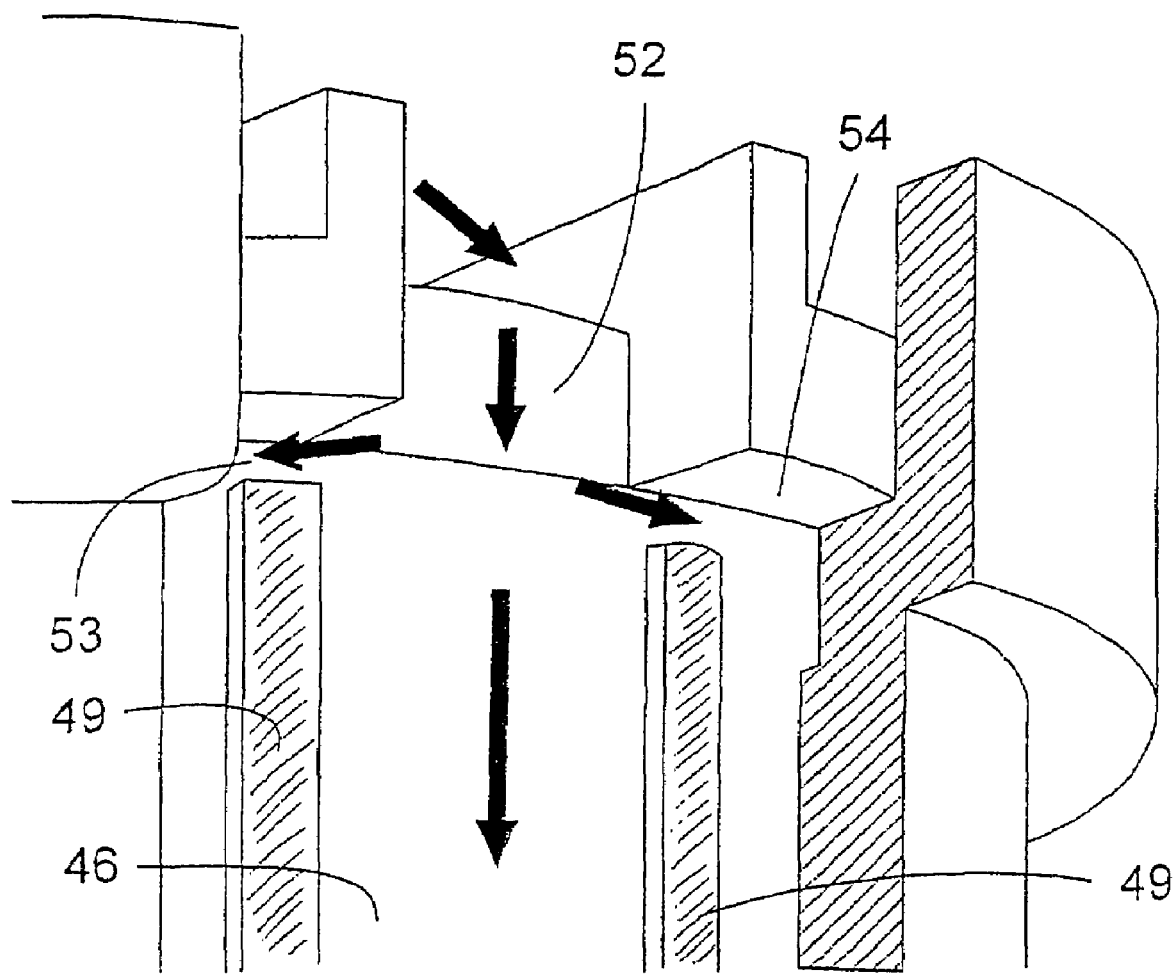

FIGS. 4a and 4b illustrate the inlet fluid being directed below the top cap 38 (FIG. 2b) through the cut out 52 where it then is split off. Most of the fluid travels down the side fluid channel 46 created with two ribs 49 found on the inside of the bowl 42 (FIG. 2b) to sweep the housing bowl bottom 25 (FIG. 6b) to prevent stagnant fluid locations and the formation of gel particles. The other portion of the inlet fluid enters fluid channels 53 and 54 to sweep out gas pockets around the underside of the top cap 38 (FIG. 2b). By creating a mechanical seal between the top cap 38 (FIG. 2b) and the housing bowl 42 (FIG. 2b), a flow path which allows fluid to travel beneath the top cap 38 (FIG. 2b) and then back above on the opposite side through cut out 51 is generated with two channels 53 and 54.

Figure 5:
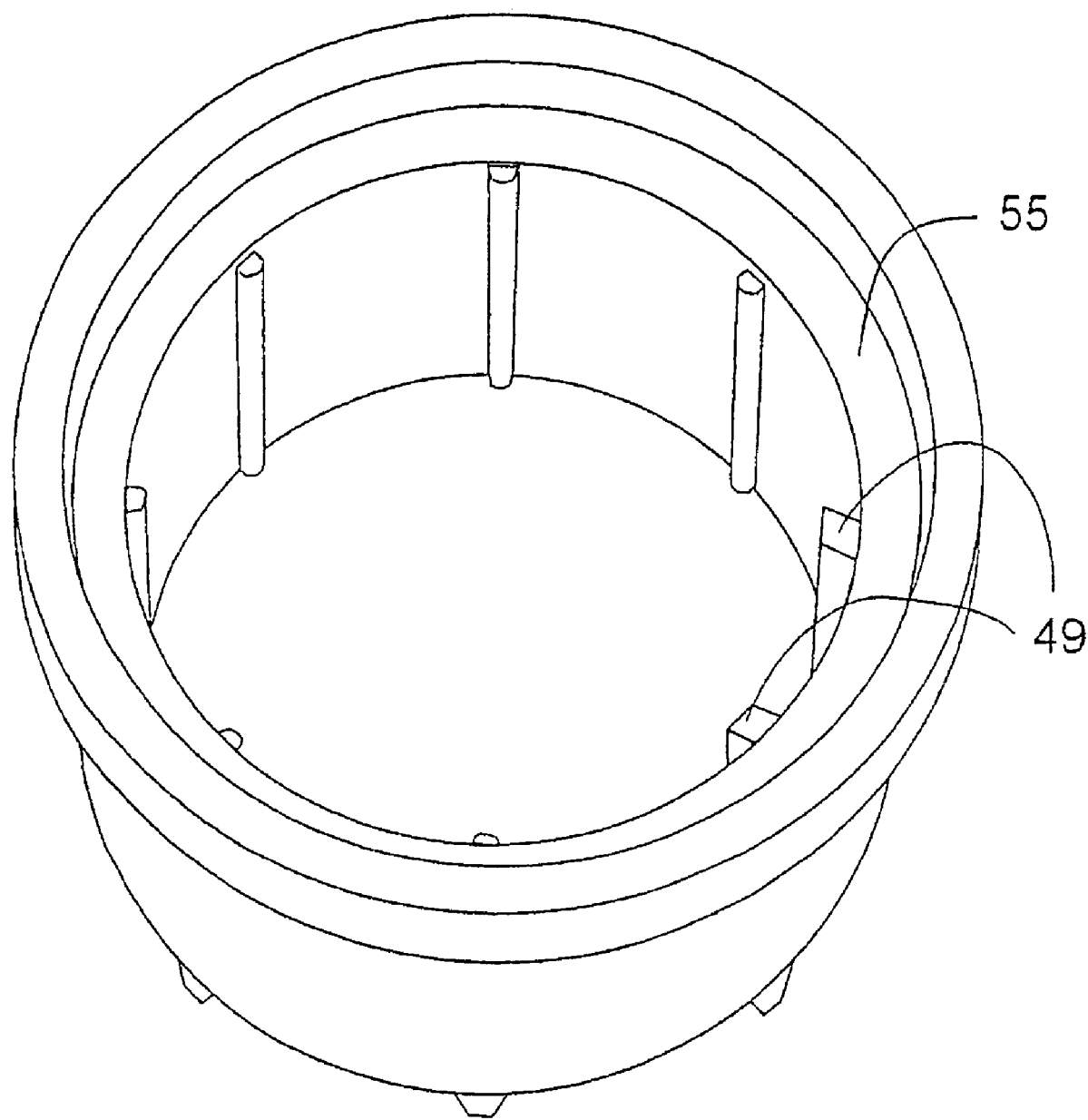
FIG. 5 is a top view of the bowl of the filtration device of the present invention.

FIG. 5 illustrates the two larger ribs 49 positioned a short distance below the top cap seal ridge 55 to direct the inlet fluid to sweep the bottom of bowl 42 (FIG. 2b) and the underside of the top cap 38 (FIG. 2b).

Figure 6A:
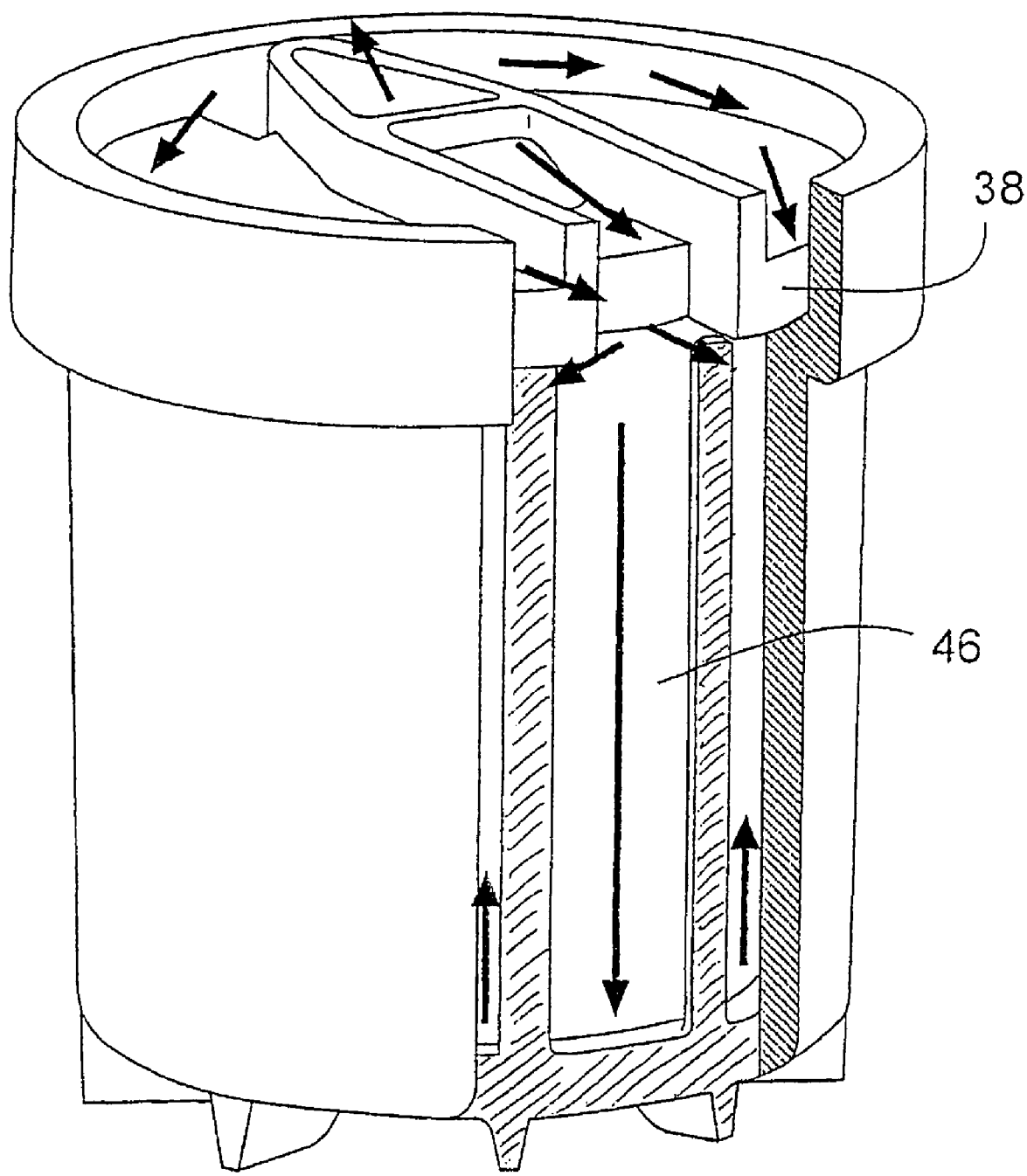
FIG. 6a is a partial section view of the present invention which shows fluid channels with arrow representation of the fluid flow path.
Figure 6B:
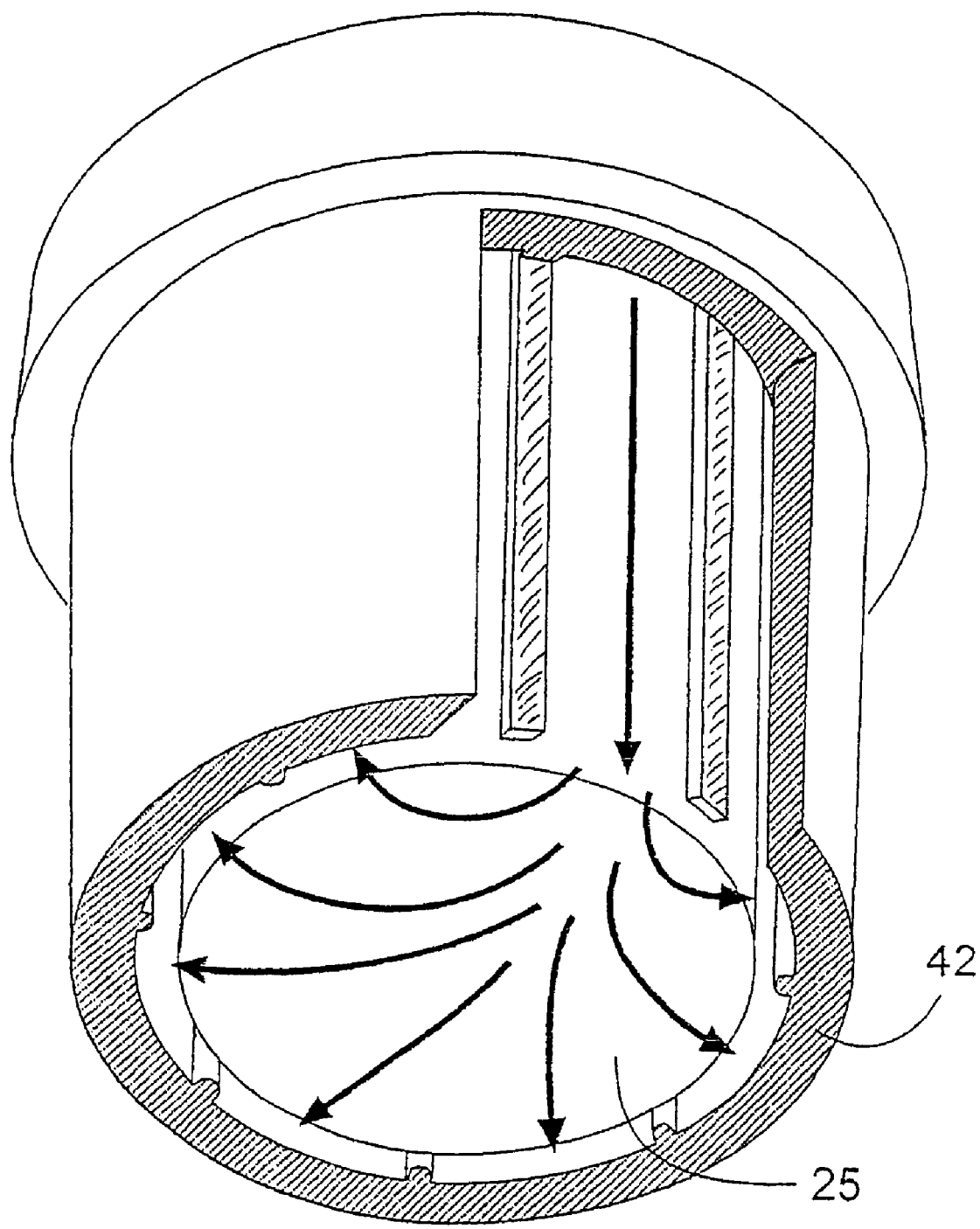

FIGS. 6a and 6b illustrate the flow of liquid as shown by the arrows. The inlet fluid is directed down the side channel 46 created by ribs 49 (FIG. 5) and sweeps the volume between the bottom of the filter media 40 (FIG. 2b) and the bottom inner surface of bowl 42. The fluid is also directed through channels 53 and 54 (FIG. 4b) to sweep the underside of the top cap 38.

Figure 7:
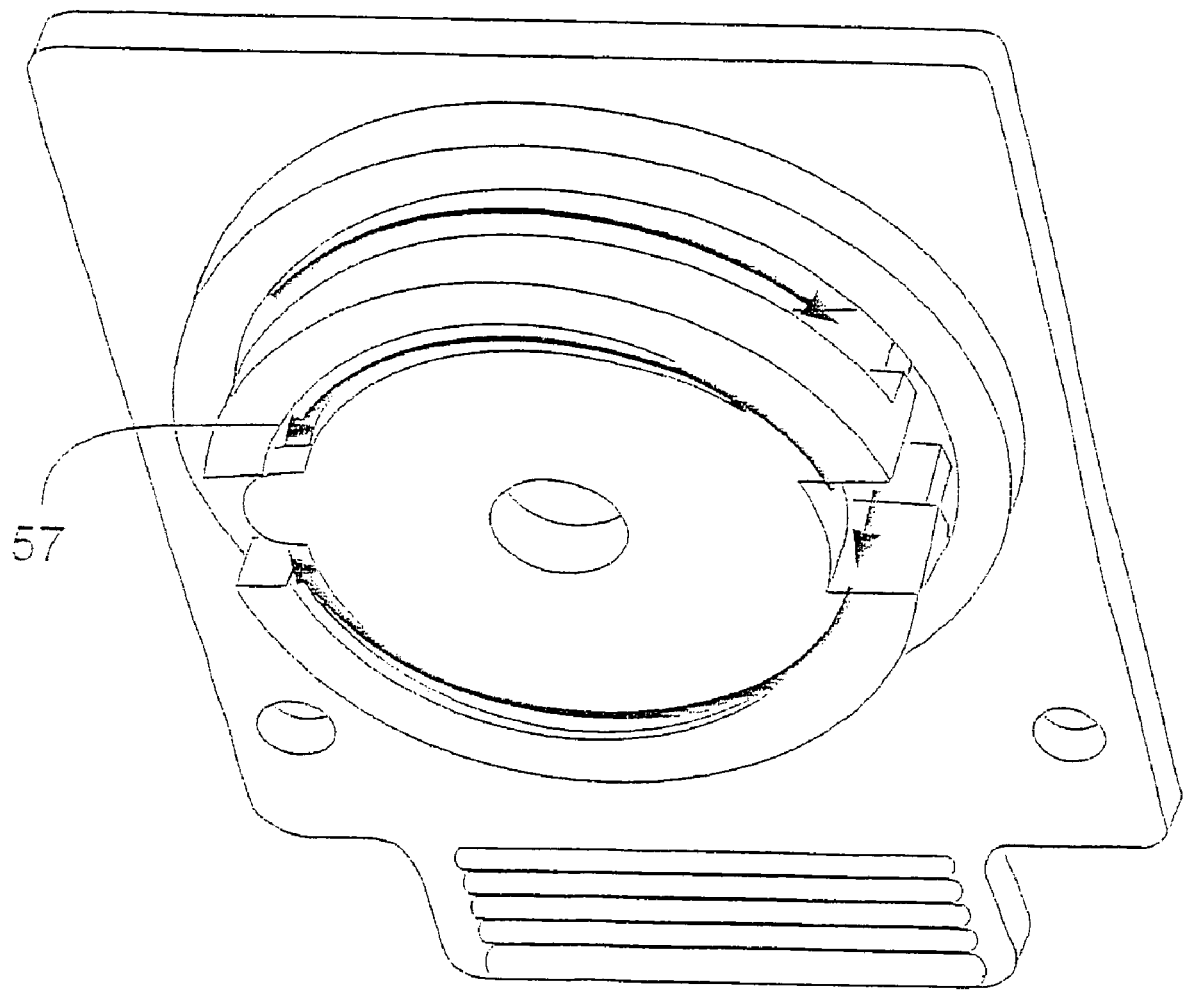
FIG. 7 is an underside view of the top cap and housing with arrows representing the fluid flow paths.

FIG. 7 illustrates the fluid flow as it is directed about the underside 57 of the top cap 38 (FIG. 2b) through second channel 33 (FIG. 2b) on an increasing slope to eliminate gas bubbles.

Figure 8:
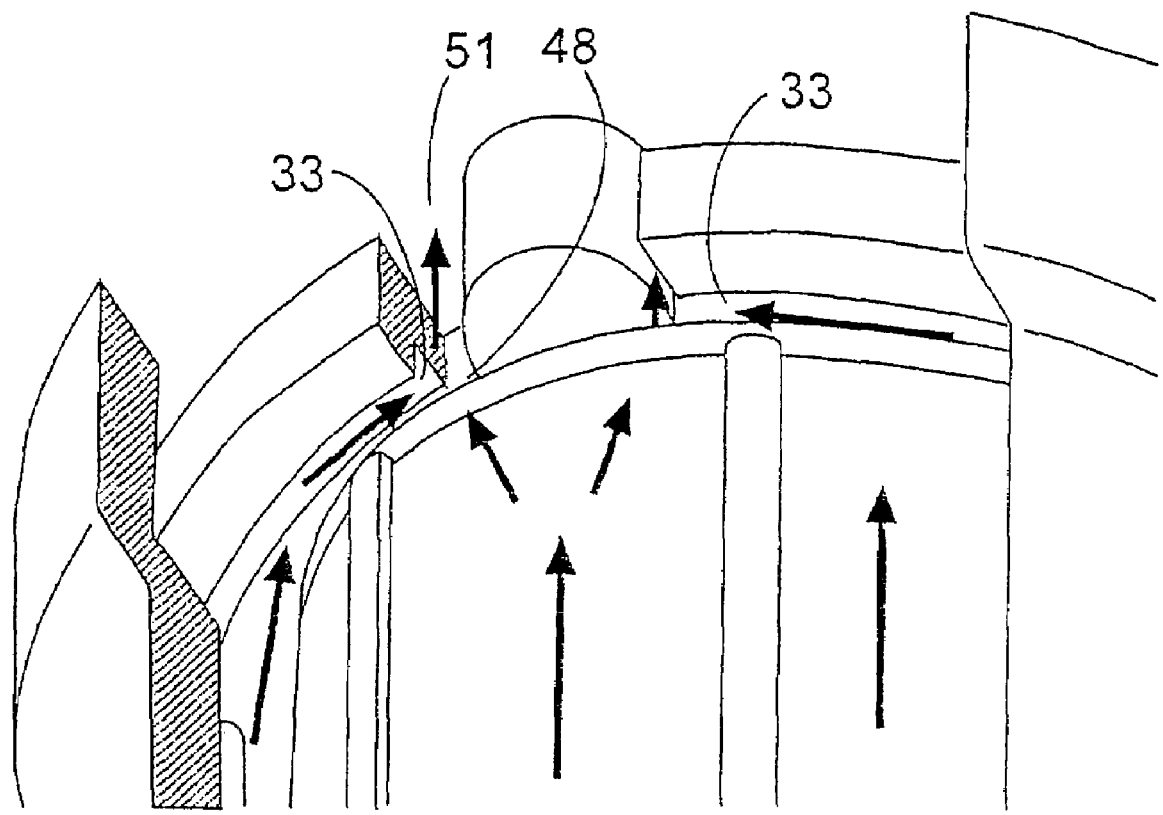
FIG. 8 is a partial sectional view of the present invention which shows a fluid channel and arrow representations of fluid flow paths.

FIG. 8 illustrates the converging flow paths to access point 48 directing air bubbles through second channel 33, through cut out 51 and above the top cap 38 (FIG. 2b) into the volume between the top cap 38 (FIG. 2b) and the cover 36 (FIG. 2b).

Figure 9:
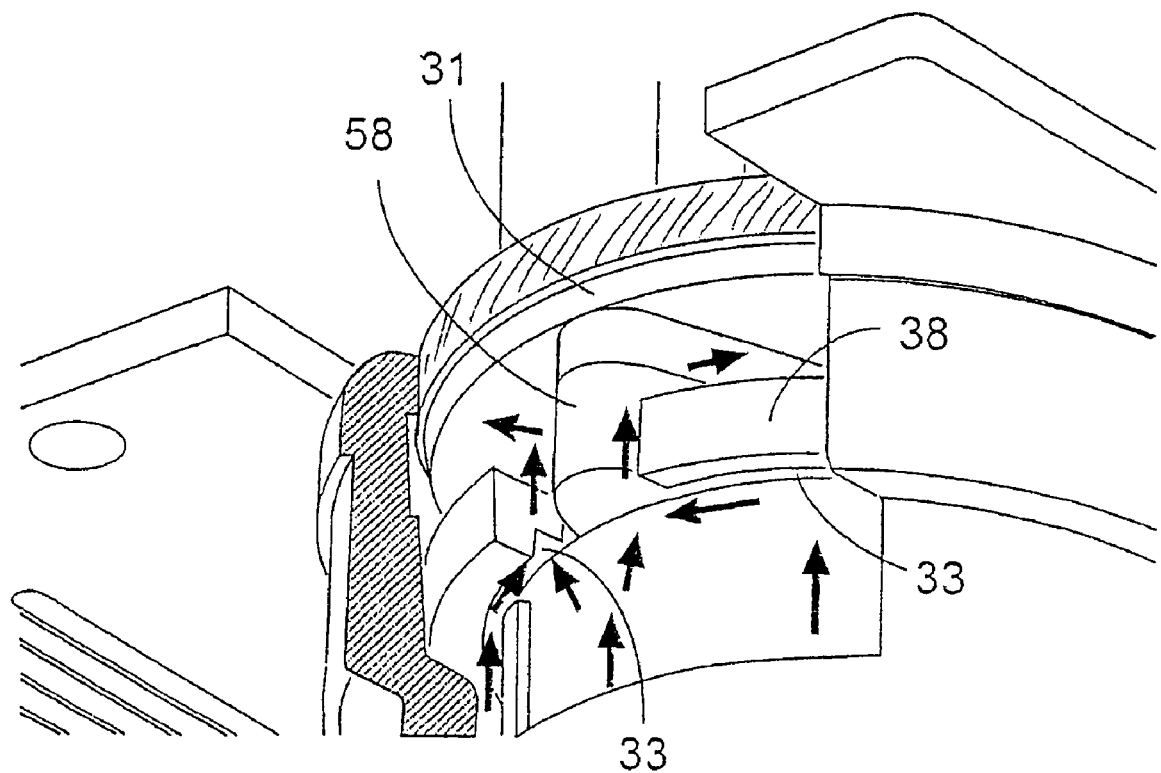
FIG. 9 is a partial sectional view of the present invention which shows a fluid channel and the convergence of fluid flow paths access point to force air bubbles above filter cartridge.

FIG. 9 illustrates the flow path being directed back above the top cap 38 at the lowest location (nadir) 58 of the volume under the housing cover 36 (FIG. 2b). This ensures that the liquid is forcing the gas bubbles along the underside of the top cap 38 (FIG. 2b) to channel 31 (FIG. 2b).

Figure 10:
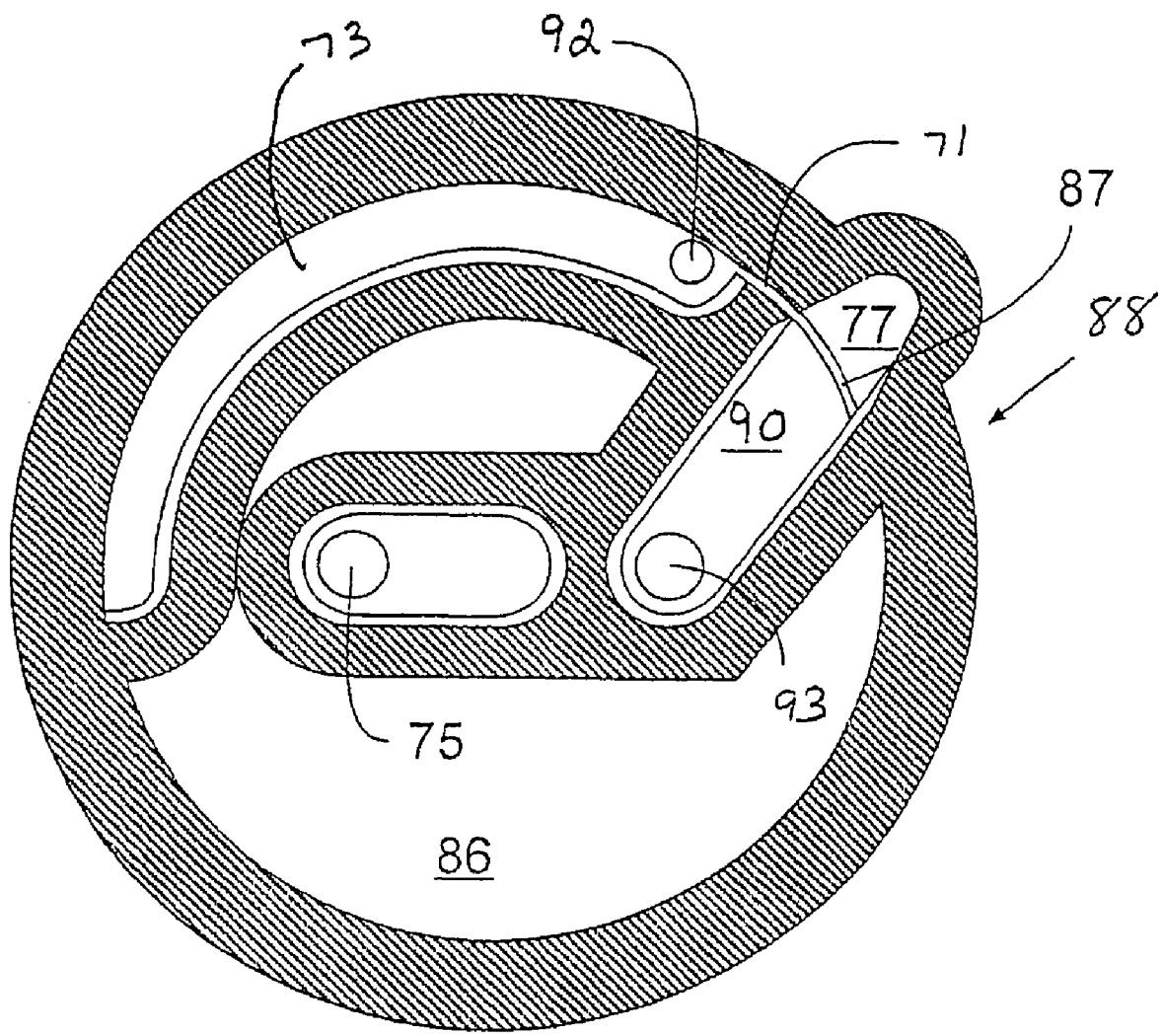
FIG. 10 is a bottom view of an alternative housing cover of this invention.
Figure 11:
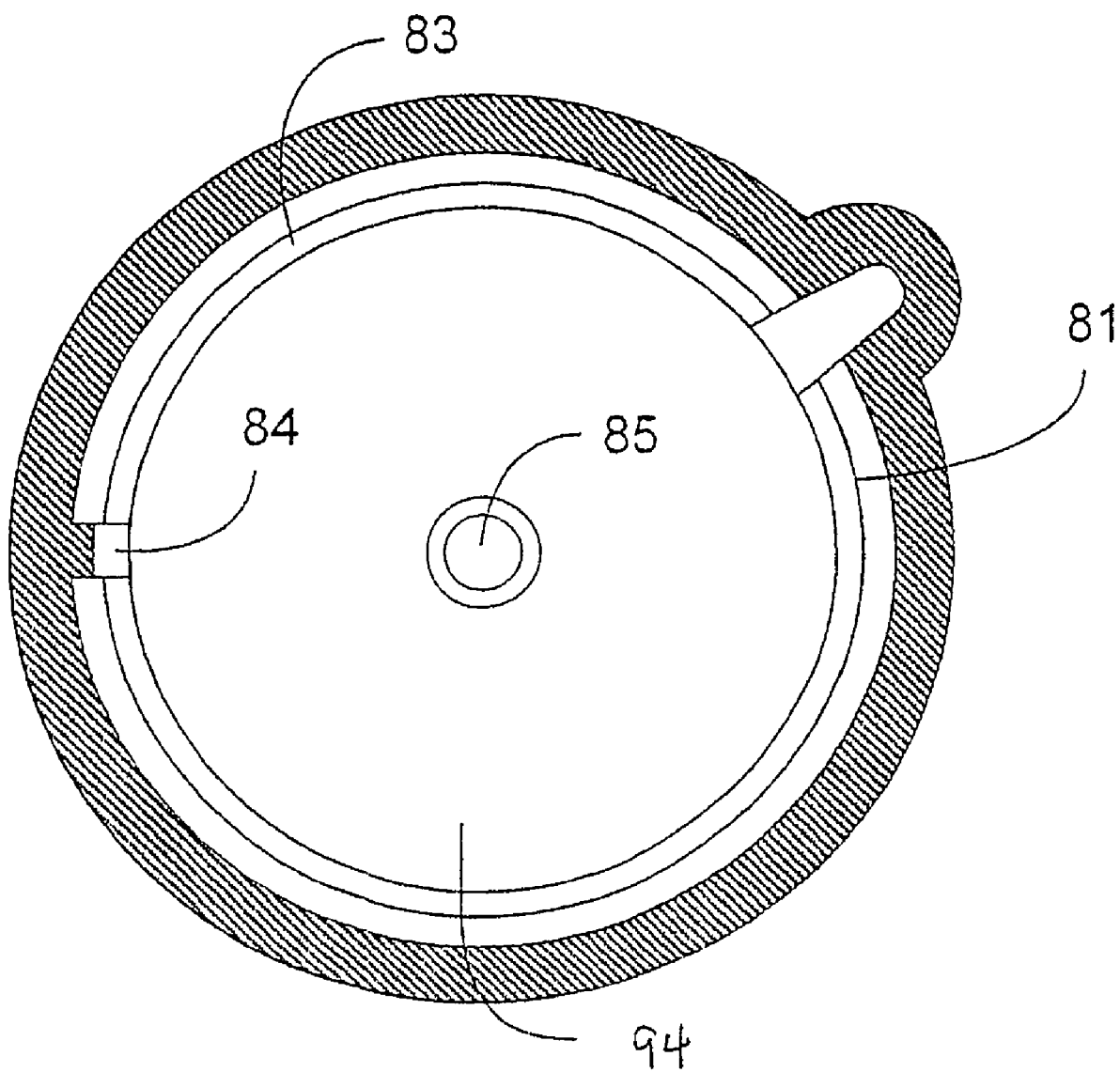
FIG. 11 is a bottom view of an alternative top cap of this invention used in conjunction with the housing cover of FIG. 10.

FIG. 10 illustrates a housing cover 88 with a restricted fluid flow path 71 is provided to prevent reverse fluid flow along channel 73. The restricted flow path 71 allows critical surfaces to be swept during the vent process alone. During the vent process, only a small amount of the fluid entering the fluid inlet 93 is able to pass directly to the vent 92 while the remainder of the fluid velocity is maintained to continue fluid flow below the top cap 81 (FIG. 11) of the filter cartridge 40 (FIG. 2b) and sweep the underside of the top cap 81. The fluid then converges to the access point 84 of the vent groove 73 where the fluid velocity can be more easily maintained with a small cross-sectional area. In contrast, with unrestricted access to the gas vent 92, the sweeping of the cartridge must be done during the filtration process, thus being less effective than the vent process or both the vent and filtration processes. The housing cover 70 is provided with vent 92, fluid inlet 93 and fluid outlet 75. Both inner surfaces 90 and 77 slope toward gas vent ridge 87 to facilitate gas flow to gas vent 92. As shown in FIG. 11, the under surface 94 of top cap 81 is provided with gas channel 83 which converges to access point 84 which is in fluid communication with channel 73 (FIG. 10). Top cap 81 also is provided with outlet 85 which is in fluid communication with outlet 75 (FIG. 10). The top cap of FIG. 11 is bonded to housing cover 88 to block area 86 thereby to reduce the hold-up volume and create the fluid flow paths of the filtration apparatus.

The present invention also provides a method for operating the liquid filtration device of this invention in systems for filtering and dispensing process fluids. In a typical application (also called single stage technology), filters are installed dry between a dispense mechanism (e.g. diaphragm pump, air pressurized canister, etc) and an outlet nozzle that directs the fluid onto a substrate such as a semiconductor wafer or optical disc. To remove air from the filter's pores, the process fluid is pushed into the filter and flushed out both the vent and the outlet ports until each fluid stream contains no visible air bubbles. Unfortunately, the fluid sent out the vent and outlet contains many bubbles, and it is well known that bubbles can cause defects on or in a coated substrate. Therefore, this bubble-laden fluid is normally directed to waste and not re-used, and this practice can consume a significant amount of fluid. Process fluids can be expensive ($1,000 to $10,0000 per liter) and minimizing waste by more efficiently eliminating bubbles is important.

Typical filtration devices are not optimized to remove bubbles. The preferred operation orientation to remove bubbles uses the filter with the fluid inlet at the bottom and the vent at the top. Although this efficiently removes large gas bubbles from the device, smaller bubbles introduced through the inlet rise slowly along the outside of the membrane. Purging these bubbles from the upstream side of the device takes considerable time and wastes fluid. In addition, bubbles can be absorbed by the membrane, resulting in de-wet spots causing shorter filter lifetime and bubble induced substrate defects.

With a TST system, a microprocessor controls the actions of two pumps with a filter between them to allow for many process benefits. The designs of these systems also allow for recirculation of bubble-laden fluid to minimize the amount of fluid that is wasted during start-up of a new filter. During start-up of a dry filter, fluid is pushed through the filter to the downstream side, where the bubble-laden fluid (from gas removed from the pores of the filter membrane) is cycled back to the inlet of the pump. This fluid is then brought back to the upstream side of the filter. Since the membrane pores are now filled with the process fluid, the membrane is a more effective (but not completely effective) barrier to bubble passage. In the prior art Impact LHVD filter, the bubble laden fluid is directed to the bottom of the filter. Bubbles must then rise by buoyant forces to the filter's vent where they are removed either by an automatic means (software triggered vent valve) or by a manual means (manually actuated vent valve). Although this is a more efficient method for removing bubbles from the filter and conserving fluid, waste is still generated, as the venting process is not optimized. For all of these systems, bubble venting is not optimized as the venting process releases not just bubbles but a bubble saturated fluid stream. Since bubbles do not rise quickly in many process fluids, the motion of the fluid toward the vent is required to remove the bubbles (effectively, the bubbles are carried along by the fluid stream). In addition, the smaller the bubbles to be removed, the more fluid that is ejected in the stream.

Bubble venting with the liquid filtration device of this invention can use an algorithm to automatically control the venting of filters ("smart venting"). Specifically, smart venting will limit the number of times that the filter undergoes a vent cycle, and it will limit the amount of fluid that is lost during each vent cycle.

Typically, filters are vented during start-up and during operations as follows:

(A) In a TST system during filter start-up, the filter is vented every fifth cycle to remove entrapped bubbles. Typically, the vent valve opens for 250 milliseconds, and approximately 50 to 150 microliters of fluid is sent to waste. During a typical start-up and preconditioning process, the filter can be vented more than 200 times. Therefore, this process wastes between approximately 10 milliliters and 30 milliliters of fluid. Also, during normal operation, the filter is vented every cycle, again resulting in between 50 and 150 microliters being lost per each dispense.

(B) In non-TST applications, venting is usually a manual process and is at the discretion and convenience of the operator. During start-up, venting is more frequent, but the manual aspect of venting results in between 50 to 100 milliliters of fluid loss. Also, since there is typically no recirculation of the filter's downstream fluid, an additional 500 to 1500 milliliters can be wasted conditioning the filter. Finally, during operation, venting can be done once per day, and again, between 20 and 30 milliliters can be lost each time.

Figure 12:
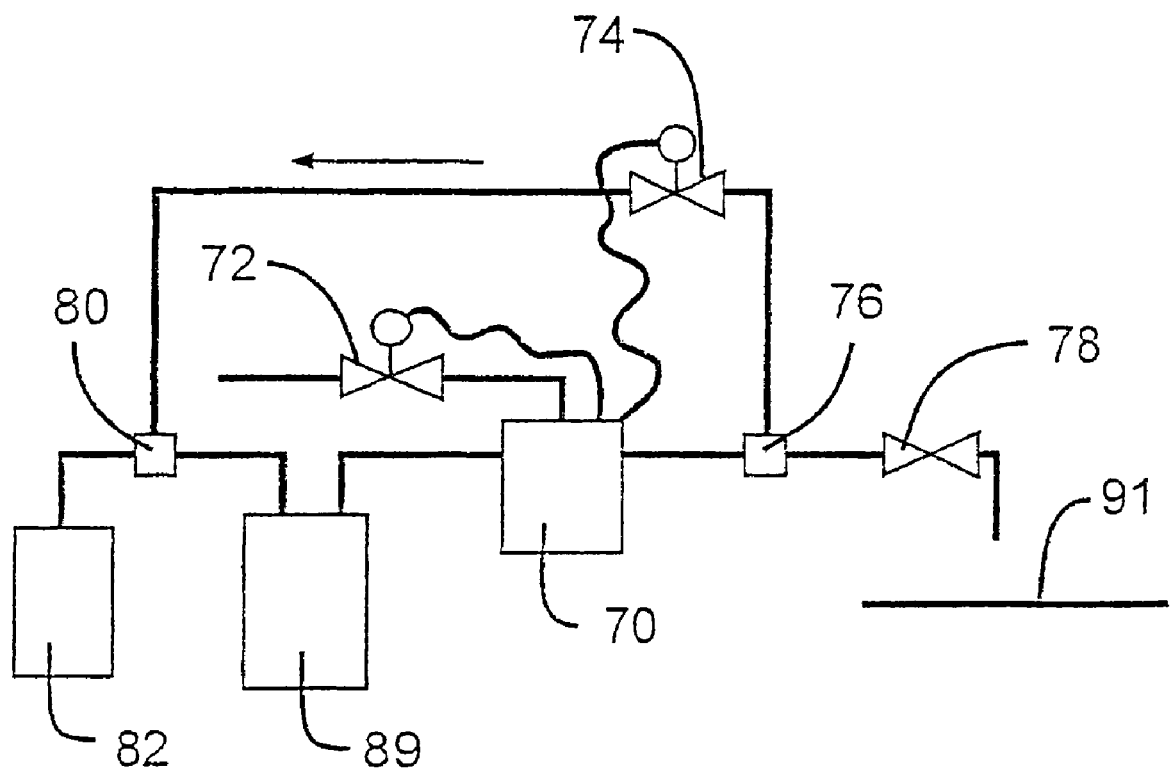
FIG. 12 is a flow diagram illustrating an automated method for operating the device of this invention.

With the liquid filtration device of this invention, smart venting is programmable and automated. On a single stage system, this could be accomplished by using an "intelligent" manifold and the device of this invention. The current IMPACT ST manifold is a passive device, but it can be made to do smart venting by adding a microprocessor and several fluid connections (e.g., solenoid valves, tees). A description of such a system is shown in FIG. 12. In this figure, the manifold with the filter device of this invention 70 controls the operation of solenoid vent valve 72 and solenoid recirculation valve 74. The manifold with the device of this invention is also in communication with a pump 89. Tee connection 76 is positioned so that fluid can be directed either through recirculation valve 74 or through the stop and suckback valve 78 to the substrate 84. Tee 80 is positioned both to accept fluid from fluid source 82 during normal operation or from valve 74 when the fluid is recirculated to the manifold and filter device 70. At start-up of a new filter, recirculation valve 74 and stop and suckback valve 78 are closed and vent valve 72 is opened. Fluid is then sent into the manifold to fill the housing of the filtration device. After the housing is full, fluid can then be recirculated automatically while vent valve 72 is closed and recirculation valve 74 is open so that vent loss can be minimized. At selected times during recirculation (either timed or after a certain number of cycles), the recirculation valve 74 is closed and the vent valve 72 is opened to remove gas from the manifold and filter 70. After the filter has been primed, valve 74 is closed and valve 78 is opened so that fluid can be deposited on substrate 91.

In most cases, the number of cycles between venting could be lengthened by using the device of this invention. Since bubbles are preferentially trapped and coalesce at the top of the filtration device, they are not in contact with or pass by the filter membrane. As such, they will not form de-wet spots (i.e., causing shorter filter lifetime or introducing bubble induced substrate defects). Therefore, the time between vent processes can be increased.

Also, the vent valve opening (time and geometry) can be minimized. Currently, the vent valve must be sufficiently open to allow for bubble-laden fluid to flow through the valve. However, since the bubbles will coalesce into larger bubbles, air (with its lower viscosity) flows more easily than fluid through a small passage, and opening the vent ever so slightly for a short time interval would allow air to pass through while not allowing fluid to pass. This could be accomplished by either setting a short vent opening time or controlling the vent valve to minimize its open orifice area. Both would be effective in minimizing the opening of the valve for different viscosity fluids, and both would minimize fluid loss through the vent.

The automatic operation method of this invention can be further improved by incorporation of the following features:

(A) Install a membrane contactor type of degasser in the system. This degasser can be installed on the filter's vent line. Also, on a single stage system, it can be upstream of the filter; and on a two stage technology system it is positioned on the upstream side of the pump (but downstream of the line used to recirculate the fluid during start-up). Such a degasser remove bubbles and prevent microbubble formation without affecting the fluid stream. This also has the advantage of practically eliminating venting during normal operation. Other degassing means (e.g., sparging, heating, vacuum, etc.) can be used, but those means usually result in undesirable changes to the process fluid (e.g., viscosity change due to solvent evaporation).

(B) Install a bubble detector either in the vent line, in the vent port of the filter itself or in the manifold that connects the filtration device to a two stage technology system. Venting then can be enabled only when the bubble detector senses a sufficient quantity of gas with a signal being read by a microprocessor. In addition, venting can be controlled such that only bubbles are vented and not fluid.

While this invention has been particularly shown and described with references to preferred embodiments thereof, it will be understood by those skilled in the art that various changes in form and details may be made therein without departing from the scope of the invention encompassed by the appended claims.

What is claimed is:

1. A liquid filtration device with internal flow paths that facilitate the purging of air bubbles therefrom, the device comprising:

a housing, the housing including a bowl, a cap, and a cover, the bowl defining an opening that receives a filter medium, the cap substantially covering the opening of the bowl and the filter medium, the cover being fitted to the cap and the bowl, the cover including a fluid inlet, a fluid outlet, and a vent; and a first fluid channel directing fluid from the inlet toward the vent, the first fluid channel defined in a first volume between the cover and the cap, the first fluid channel accumulating bubbles from the fluid near the vent as the fluid enters the filter device, the inlet and vent being positioned at the same end of the housing.

2. The device of claim 1 further comprising:

a second fluid channel directing fluid from the first fluid channel to sweep an undersurface of the cap, the second fluid channel being defined in a second volume between an undersurface of the cap and the filter medium, the second fluid channel accumulating bubbles from the fluid that collect or form near the undersurface of the cap; and an aperture directing the fluid from the second channel back to the first fluid channel, the aperture being defined in the cap and coupling the second fluid channel with the first fluid channel, the first fluid channel accumulating bubbles recovered in the second fluid channel near the vent.

3. The device of claim 2 further comprising:

a third fluid channel directing the fluid from the first fluid channel toward the bottom of the bowl, the third fluid channel being defined between the bowl and the filter medium, the third fluid channel enabling the fluid to sweep the bottom of the bowl; and a plurality of fourth fluid channels further directing the fluid from the bottom of the bowl toward the second fluid channel.

4. The device of claim 3 wherein the third fluid channel is defined between at least two ribs positioned axially along the inside of the housing bowl.

5. The device of claim 3 wherein the plurality of fourth fluid channels converge with the second fluid channel at or near the nadir of the volume between the cap and the cover of the housing.

6. The device of claim 5 wherein the plurality of fourth fluid channels are each defined between at least two ribs positioned axially along the inside of the housing bowl.

7. The device of claim 2 wherein the second fluid channel extends substantially about the circumference of the cap, the second fluid channel defining a flow path allowing fluid to travel beneath the cap and then back above the cap through an aperture into the first fluid channel for expulsion through the vent.

8. The device of claim 1 wherein the first fluid channel is characterized by cross-sectional areas that facilitate a fluid velocity that enables removal of bubbles from the fluid flowing through the first fluid channel.

9. The device of claim 1 wherein the first fluid channel extends substantially about the circumference of the housing cover, such that the first fluid channel spirals up from an outlet side of the cover to provide a pathway for bubbles to be directed to the vent.

10. The device of claim 1 wherein the underside of the cap includes a sloped surface, the sloped surface having a nadir and a zenith, the zenith being juxtaposed to the vent.

11. The device of claim 1 wherein the housing cover includes an internal surface angled toward a vent side of the cover to provide a pathway for bubbles to be directed to the vent.

12. The device of claim 1 wherein the vent is capable of opening and closing for time intervals that minimize fluid loss.

13. The device of claim 1 further comprising:

a degassing membrane contactor coupled externally to the filter device to further eliminate bubbles.

14. A liquid filtration device with internal flow paths that facilitate the purging of air bubbles therefrom, the device comprising:

a housing, the housing comprising a bowl, a cap, and a cover, the bowl defining an opening that receives a filter medium, the cap substantially covering the opening of the bowl and the filter medium, the cover being fitted to the cap and the bowl, the cover including a fluid inlet, a fluid outlet, and a vent;

a first fluid channel directing fluid from the inlet toward the vent, the first fluid channel defined in a first volume between the cover and the cap, the first fluid channel accumulating bubbles from the fluid near the vent as the fluid enters the filter device;

a second fluid channel directing the fluid from the first fluid channel to sweep an undersurface of the cap, the second fluid channel being defined in a second volume between an undersurface of the cap and the filter medium, the second fluid channel accumulating bubbles from the fluid that collect or form near the undersurface of the cap; and an aperture directing the fluid from the second fluid channel back to the first fluid channel, the aperture defined in the cap and coupling the second fluid channel with the first fluid channel, the first fluid channel accumulating bubbles recovered in the second fluid channel near the vent.

15. A liquid filtration device with internal flow paths that facilitate the purging of air bubbles therefrom, the device comprising:

a housing, the housing comprising a bowl, a cap, and a cover, the bowl defining an opening that receives a filter medium, the cap substantially covering the opening of the bowl and the filter medium, the cover being fitted to the cap and the bowl, the cover including a fluid inlet, a fluid outlet, and a vent;

a first fluid channel directing the fluid from the inlet of the filter device toward the bottom of the bowl, the first fluid channel defined between the bowl and the filter medium, the first fluid channel enabling the fluid to sweep the bottom of the bowl; and at least one second fluid channel directing the fluid from the bottom of the bowl toward the vent for removal of bubbles in the fluid.

16. The device of claim 15 wherein the housing cover includes an interior surface being angled toward the vent to enable bubbles removed from the fluid to rise to the vent.

17. The device of claim 15 wherein an interior wall of the housing bowl is fitted to the exterior wall of the filter medium, such that the first fluid channel is defined therebetween for directing the fluid from the inlet of the filter device toward the bottom of the bowl.

18. The device of claim 15 wherein at least one flow channel is defined between the interior bottom of the housing bowl and the exterior bottom of the filter medium, such that at least one fluid channel is defined therebetween for sweeping the interior bottom of the housing bowl.

19. A liquid filtration device with internal flow paths that facilitate the purging of air bubbles therefrom, the device comprising:

a housing, the housing comprising a bowl, a cap, and a cover, the bowl defining an opening that receives a filter medium, the cap substantially covering the opening of the bowl and the filter medium, the cover being fitted to the cap and the bowl, the cover including a fluid inlet, a fluid outlet, and a vent, a first fluid channel being defined in a first volume between the cover and the cap, the inlet and vent being positioned at the same end of the housing;

a second fluid channel directing the fluid from the first fluid channel to sweep an undersurface of the cap, the second fluid channel being defined in a second volume between an undersurface of the cap and the filter medium, the second fluid channel accumulating bubbles from the fluid that collect or form near the undersurface of the cap; and an aperture directing the fluid from the second fluid channel back to the first fluid channel, the aperture defined in the cap and coupling the second fluid channel with the first fluid channel, the first fluid channel accumulating bubbles recovered in the second fluid channel near the vent.

20. The device of claim 19, wherein the vent is capable of opening to enable the bubbles that accumulate near the vent to be expelled.

21. The device of claim 19 wherein the second fluid channel extends substantially about the circumference of the cap, the second fluid channel defining a flow path allowing fluid to travel beneath the cap and then back above the cap through an aperture into the first fluid channel for expulsion through the vent.

22. The device of claim 19 further comprising:
a third fluid channel directing the fluid from the first fluid channel toward the bottom of the bowl, the third fluid channel defined between the bowl and the filter medium and enabling the fluid to sweep the bottom of the bowl; and
a plurality of fourth fluid channels directing the fluid from the bottom of the bowl toward the second fluid channel.

23. The device of claim 22 wherein the third fluid channel is defined between at least two ribs positioned axially along the inside of the housing bowl.

24. The device of claim 22 wherein the plurality of fourth fluid channels converge with the second fluid channel at or near the nadir of the volume between the cap and the cover of the housing.

25. The device of claim 24 wherein the plurality of fourth fluid channels are each defined between at least two ribs positioned axially along the inside of the housing bowl.

26. The device of claim 22 wherein an interior wall of the housing bowl is fitted to the exterior wall of the filter medium, such that the third fluid channel is defined therebetween for directing the fluid from the inlet of the filter device toward the bottom of the bowl.

27. The device of claim 19 wherein the first fluid channel is characterized by cross-sectional areas that facilitate a fluid velocity that enables removal of bubbles from the fluid flowing through the first fluid channel.

28. The device of claim 19 wherein the first fluid channel extends substantially about the circumference of the housing cover, such that the first fluid channel spirals up from an outlet side of the cover to provide a pathway for bubbles to be directed to the vent.

29. The device of claim 19 wherein the underside of the cap includes a sloped surface, the sloped surface having a nadir and a zenith, the zenith being juxtaposed to the vent.

30. The device of claim 19 wherein the housing cover includes an internal surface angled toward a vent side of the cover to provide a pathway for bubbles to be directed to the vent.

31. The device of claim 19 wherein the vent is capable of opening and closing for time intervals that minimize fluid loss.

32. The device of claim 19 further comprising:
a degassing membrane contactor externally coupled in fluid connection with the filter device to further eliminate bubbles.

33. The device of claim 19 wherein at least one flow channel is defined between the interior bottom of the housing bowl and the exterior bottom of the filter medium, such that at least one fluid channel is defined therebetween for sweeping the interior bottom of the housing bowl.

* * * * *